US011964396B2

(12) United States Patent
Kajiyama et al.

(10) Patent No.: US 11,964,396 B2
(45) Date of Patent: Apr. 23, 2024

(54) DEVICE AND METHOD FOR ACQUIRING DEVIATION AMOUNT OF WORKING POSITION OF TOOL

(71) Applicant: Fanuc Corporation, Yamanashi (JP)

(72) Inventors: Takafumi Kajiyama, Yamanashi (JP); Hiroshi Nakagawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 752 days.

(21) Appl. No.: 16/906,082

(22) Filed: Jun. 19, 2020

(65) Prior Publication Data
US 2020/0406464 A1 Dec. 31, 2020

(30) Foreign Application Priority Data
Jun. 27, 2019 (JP) ................ 2019-120255

(51) Int. Cl.
*B25J 9/16* (2006.01)
(52) U.S. Cl.
CPC ........... *B25J 9/1697* (2013.01); *B25J 9/1692* (2013.01)
(58) Field of Classification Search
CPC ........ B25J 9/1697; B25J 9/1692; B25J 9/161; B25J 19/0095; B25J 19/04; G05B 2219/31048; G05B 2219/40613; G05B 2219/45104; G05B 2219/45138; Y02P 90/02
See application file for complete search history.

(56) References Cited

U.S. PATENT DOCUMENTS

| 4,761,596 A | 8/1988 | Nio et al. |
| 2007/0075048 A1* | 4/2007 | Kunisaki ............ G05B 19/4083 |
| | | 219/91.1 |
| 2017/0266758 A1 | 9/2017 | Fukui et al. |
| 2020/0016757 A1* | 1/2020 | Sakuramoto ............ B25J 13/08 |

FOREIGN PATENT DOCUMENTS

| CN | 102581445 A | 7/2012 | |
| CN | 105345264 A | 2/2016 | |
| CN | 207858011 U | 9/2018 | |
| CN | 115488926 A | * 12/2022 | |
| CN | 113900436 B | * 11/2023 | ........... G05D 1/0217 |

(Continued)

*Primary Examiner* — Robert T Nguyen
(74) *Attorney, Agent, or Firm* — Buchanan Ingersoll & Rooney PC

(57) ABSTRACT

A device capable of acquiring a deviation of a working position of a tool with respect to a target position of a workpiece with higher accuracy in accordance with actual work. A device for acquiring a deviation amount of a working position of a tool with respect to a target position when a work is performed on a workpiece with respect to the target position by the tool, the tool being moved by a movement machine, the device including: a camera arranged in a predetermined positional relationship with respect to the tool and configured to image the target position at a first time point when the tool performs an operation for the work; and a deviation amount acquisition section configured to acquire a deviation amount between the working position and the target position at the first time point, based on a position of the target position in image data imaged by the camera and information indicating a position of the working position in the image data.

12 Claims, 22 Drawing Sheets

(56) References Cited

FOREIGN PATENT DOCUMENTS

| | | | |
|---|---|---|---|
| JP | 61279481 | A | 12/1986 |
| JP | 05318280 | A | 12/1993 |
| JP | 08286701 | A | 11/1996 |
| JP | 2006138223 | A | 6/2006 |
| JP | 2007122705 | A | 5/2007 |
| JP | 2007190576 | A * | 8/2007 |
| JP | 2009125839 | A | 6/2009 |
| JP | 2017164764 | A | 9/2017 |
| JP | 2018176164 | A | 11/2018 |

* cited by examiner

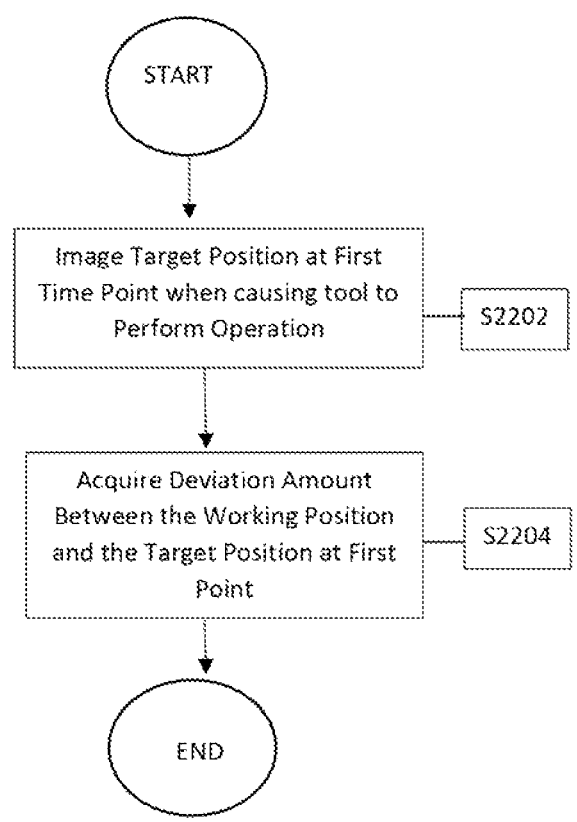

DEVICE AND METHOD FOR ACQUIRING DEVIATION AMOUNT OF WORKING POSITION OF TOOL

CROSS-REFERENCE TO RELATED APPLICATIONS

This application is a new U.S. Patent Application that claims benefit of Japanese Patent Application No. 2019-120255, dated Jun. 27, 2019, the disclosure of this application is being incorporated herein by reference in its entirety for all purposes.

BACKGROUND OF THE INVENTION

1. Field of the Invention

The present invention relates to a device and a method for acquiring a deviation amount of a working position of a tool with respect to a target position of a workpiece.

2. Description of the Related Art

In the related art, there has been known a technique (e.g., JP 2009-125839 A) in which a target position of a workpiece is imaged by a camera and a teaching point of a robot is corrected from the imaged image data in order to eliminate a deviation of a working position of a tool with respect to the target position of the workpiece.

There is a need for a technique for acquiring a deviation of a working position of a tool with respect to a target position of a workpiece with higher accuracy in accordance with an actual work.

SUMMARY OF THE INVENTION

In an aspect according to the present disclosure, a device configured to acquire a deviation amount of a working position of a tool with respect to a target position on a workpiece when performing a work on the target position by the tool moved by a movement machine, includes a camera arranged in a predetermined positional relationship with the tool and configured to image the target position at a first time point when causing the tool to perform an operation for the work; and a deviation amount acquisition section configured to acquire a deviation amount between the working position and the target position at the first time point, based on a position of the target position in image data imaged by the camera and on information indicating a position of the working position in the image data.

In another aspect of the present disclosure, a method of acquiring a deviation amount of a working position of a tool with respect to a target position on a workpiece when performing a work on the target position by the tool moved by a movement machine, includes imaging the target position by a camera arranged in a predetermined positional relationship with the tool at a first time point when causing the tool to perform an operation for the work; and acquiring a deviation amount between the working position and the target position at the first time point, based on a position of the target position in image data imaged by the camera and on information indicating a position of the working position in the image data.

According to the present disclosure, the deviation amounts between the target position on the workpiece and the working position where the tool is estimated to actually work on the workpiece can be automatically and highly accurately acquired from the image data without the operator measuring them.

BRIEF DESCRIPTION OF THE DRAWINGS

FIG. 22 is a flow diagram illustrating a method of acquiring a working position of a tool with respect to a target position on a workpiece when performing a work on the target position by the tool moved by a movement machine.

DETAILED DESCRIPTION

Figure 1:
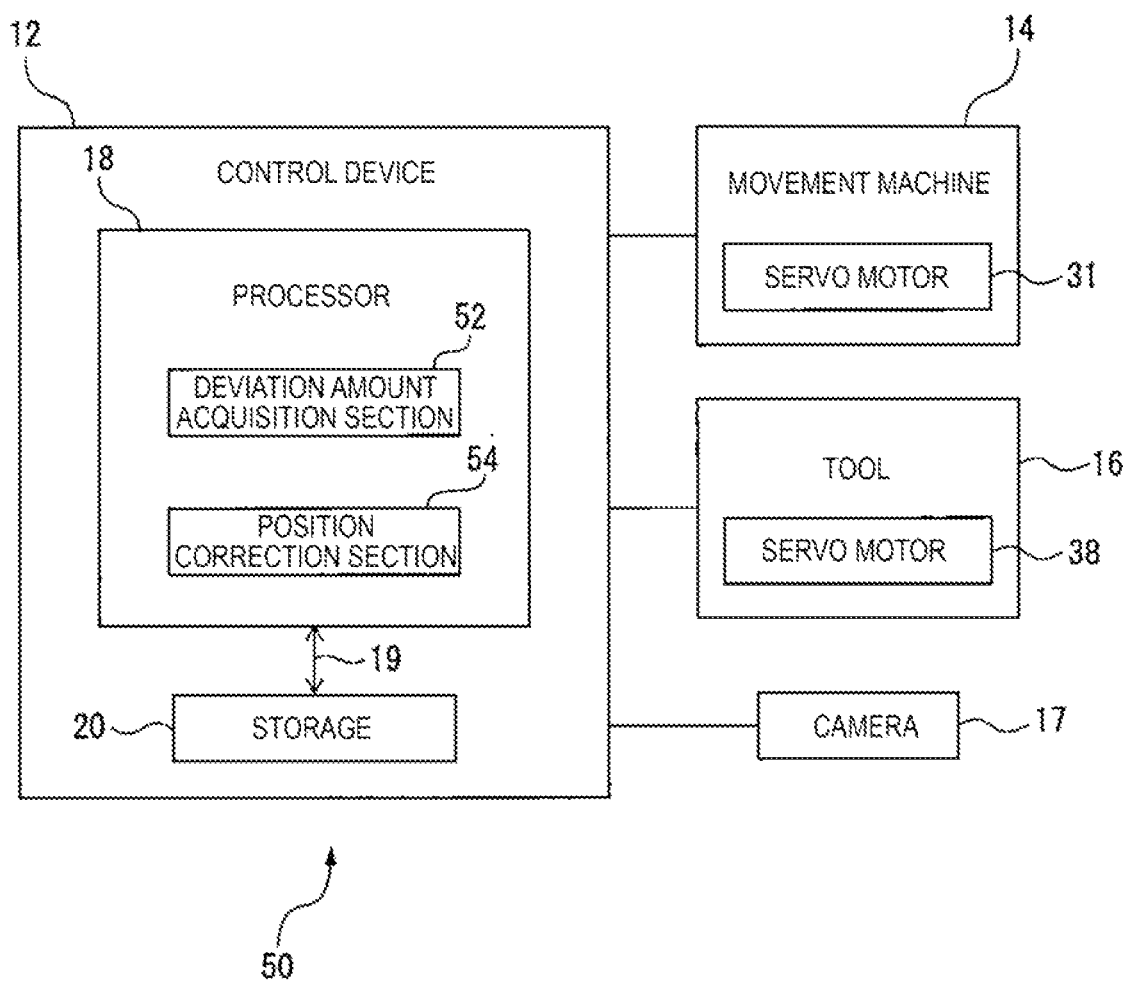
FIG. 1 is a block diagram of a machine system according to an embodiment.
Figure 2:
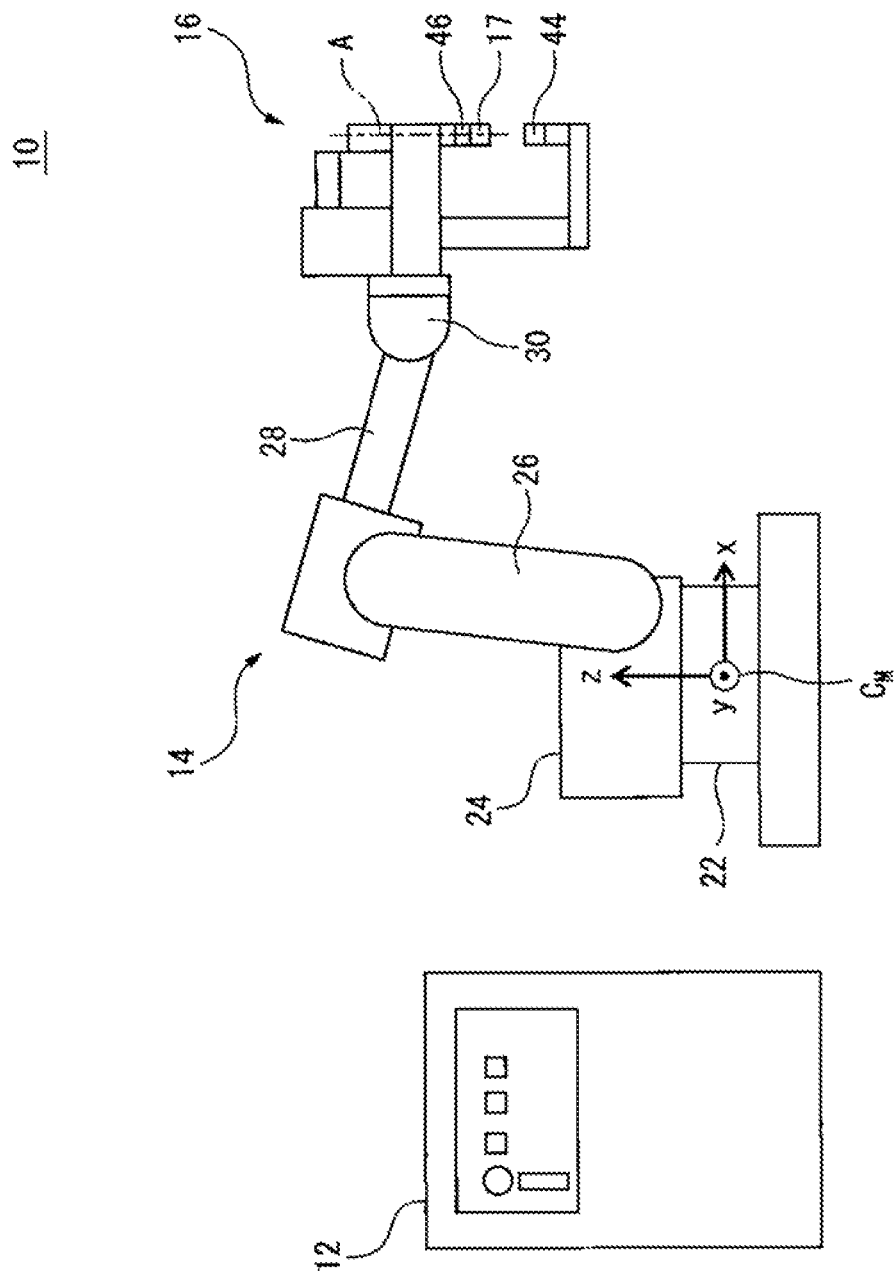
FIG. 2 is a schematic diagram of the machine system illustrated in FIG. 1.
Figure 3:
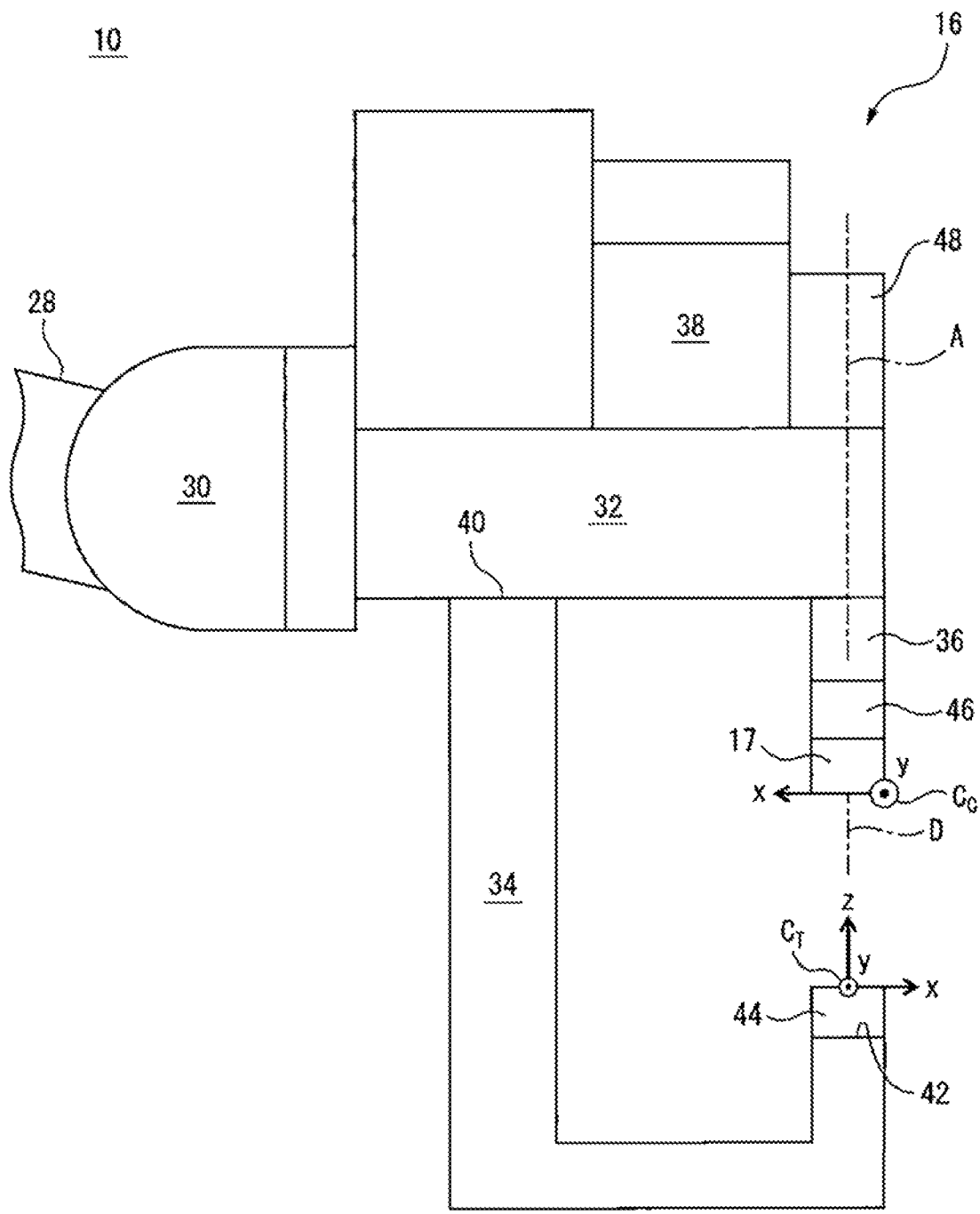
FIG. 3 is an enlarged diagram of the tool illustrated in FIG. 2.

Hereinafter, embodiments of the present disclosure will be described in detail with reference to the drawings. Note that, in the various embodiments described below, similar elements are denoted by the same reference numerals, and redundant description thereof will be omitted. Referring first to FIG. 1 to FIG. 3, a machine system 10 according to an embodiment will be described. The machine system 10 includes a control device 12, a movement machine 14, a tool 16, and a camera 17.

The control device 12 is a computer including a processor (CPU, GPU, etc.) 18 and a storage (ROM, RAM, etc.) 20, and controls the movement machine 14, the tool 16, and the camera 17. The processor 18 is communicatively connected to the storage 20 via a bus 19, and executes various processes while communicating with the storage 20.

As illustrated in FIG. 2, the movement machine 14 is a vertical articulated robot, and includes a base 22, a rotating torso 24, a lower arm 26, an upper arm 28, and a wrist 30. The base 22 is fixed on a floor of a work cell. The rotating torso 24 is provided at the base 22 so as to be rotatable about a vertical axis. The lower arm 26 is provided at the rotating torso 24 so as to be rotatable about a horizontal axis.

The upper arm 28 is rotatably provided at a distal end of the lower arm 26. The wrist 30 is rotatably provided at a distal end of the upper arm 28. A plurality of servo motors 31 (FIG. 1) are built in the base 22, the rotating torso 24, the lower arm 26, the upper arm 28, and the wrist 30, respectively. The processor 18 transmits a command to each servo motor 31 so as to drive each movable element (i.e., the rotating torso 24, the lower arm 26, the upper arm 28, and the wrist 30) of the movement machine 14.

The tool 16 is attached to the wrist 30. In the present embodiment, the tool 16 is a spot-welding gun. Specifically, as illustrated in FIG. 3, the tool 16 includes a base 32, a fixed arm 34, a movable arm 36, a servo motor 38, a fixed electrode 44, and a movable electrode 46.

The base 32 is coupled to the wrist 30. The fixed arm 34 is fixed to the base 32 at its proximal end 40, and the fixed electrode 44 is fixed to a distal end 42 of the fixed arm 34. In the present embodiment, the fixed arm 34 extends from the proximal end 40 to the distal end 42 in a substantially L-shaped curve.

The movable arm 36 is provided at the base 32 so as to be movable along an axis A (so-called gun-axis). In the present embodiment, the movable arm 36 is a rod-like member extending linearly, wherein an upper end (not illustrated) of the movable arm 36 is mechanically connected to an output shaft (not illustrated) of the servo motor 38 via a motion converting mechanism 48, and the movable electrode 46 is fixed to a lower end of the movable arm 36.

The motion converting mechanism 48 includes e.g. a ball screw mechanism, or a mechanism comprised of a timing belt and a pulley, and converts the rotational motion of the output shaft of the servo motor 38 into a reciprocating motion along the axis A. The movable arm 36 is reciprocated along the axis A by the servo motor 38 via the motion converting mechanism 48.

The fixed electrode 44 and the movable electrode 46 are arranged so as to align on the axis A. As the servo motor 38 moves the movable arm 36, the movable electrode 46 is moved along the axis A toward and away from the fixed electrode 44. The fixed electrode 44 and the movable electrode 46 are energized in response to a command from the processor 18. Thus, the workpiece held between the fixed electrode 44 and the movable electrode 46 can be spot-welded.

As illustrated in FIG. 2, a movement machine coordinate system $C_M$ is set for the movement machine 14. The movement machine coordinate system $C_M$ is a control coordinate system (so-called robot coordinate system) for automatically controlling each movable element of the movement machine 14. In the present embodiment, the movement machine coordinate system $C_M$ is set for the movement machine 14 such that the origin thereof is arranged at the center of the base 22, and the z-axis thereof is parallel to the vertical direction of the real space, wherein the rotating torso 24 is rotated about the z-axis of the movement machine coordinate system $C_M$.

On the other hand, a tool coordinate system $C_T$ is set for the tool 16 as illustrated in FIG. 3. The tool coordinate system $C_T$ is a control coordinate system for automatically controlling the position of the tool 16 in the three-dimensional space. Note that, in the present disclosure, the "position" may mean the position and orientation. In the present embodiment, the tool coordinate system $C_T$ is set for the tool 16 such that the origin thereof is arranged on the fixed electrode 44 (e.g., the center of the top surface), and the z-axis thereof coincides with (or parallel with) the axis A.

The processor 18 operates each movable element of the movement machine 14 in the movement machine coordinate system $C_M$ such that the position of the tool 16 coincides with the position defined by the tool coordinate system $C_T$. In this way, the tool 16 is moved by the movement machine 14 and positioned at any desired position in the movement machine coordinate system $C_M$.

A camera 17 includes an imaging sensor such as a CCD or CMOS, and an optical system such as a focus lens. The camera 17 is arranged in a predetermined positional relationship with the tool 16. In the present embodiment, as illustrated in FIG. 3, the camera 17 is disposed at a position on the movable electrode 46 such that a visual line direction D of the camera 17 coincides with the axis A (i.e., the z-axis of the tool coordinate system $C_T$). In the state illustrated in FIG. 3, the movable arm 36 is disposed stationary at a predetermined position (e.g., a retracted position farthest away from the fixed electrode 44) in the direction of the axis A.

The camera 17 images an object along the visual line direction D thereof, and supplies the captured image data to the control device 12. A camera coordinate system $C_c$ is set for the camera 17. The camera coordinate system $C_c$ is a coordinate system that defines coordinates of each pixel of the image data imaged by the camera 17, and therefore each pixel of the image data is expressed as the coordinates in the camera coordinate system $C_c$.

Next, the work performed by the tool 16 will be described with reference to FIG. 1 to FIG. 4. The tool 16 performs spot-welding work on a plurality of target positions $B_n$ (n=1, 2, 3, . . . ) set on a workpiece W illustrated in FIG. 4. For example, the workpiece W is a sheet metal for an automobile body. The processor 18 operates the movement machine 14 so as to position the tool 16 at an n-th teaching point $C_n$ for performing the spot-welding work on the n-th target position $B_n$.

Specifically, the processor 18 sets the tool coordinate system $C_T$ such that its origin is arranged at the n-th teaching point $C_n$, and its z-axis passes through the n-th target position $B_n$. Then, the processor 18 operates the movement machine 14 such that the position of the tool 16 coincides with the position defined by the set tool coordinate system $C_T$.

Thus, the processor 18 positions the tool 16 at the n-th teaching point $C_n$. When the tool 16 is positioned at the n-th teaching point $C_n$, the n-th target position $B_n$ is arranged between the movable electrode 46 and the fixed electrode 44. Note that the n-th teaching point $C_n$ may coincide with the n-th target position $B_n$, or may be separated away from the n-th target position $B_n$ in a predetermined direction (e.g., the z-axis negative direction of the tool coordinate system $C_T$).

Along with arranging the tool 16 at the n-th teaching point $C_n$, the processor 18 drives the servo motor 38 of the tool 16 to move the movable electrode 46 toward the fixed electrode 44, thereby holding the n-th target position $B_n$ of the workpiece W between the movable electrode 46 and the fixed electrode 44. Note that the processor 18 may start the operation to move the movable electrode 46 toward the fixed electrode 44 when the tool 16 is positioned at the n-th teaching point $C_n$.

Alternatively, the processor 18 may start the operation to move the movable electrode 46 toward the fixed electrode 44 while moving the tool 16 to the n-th teaching point $C_n$. When the n-th target position $B_n$ of the workpiece W is held between the movable electrode 46 and the fixed electrode 44, the processor 18 energizes the movable electrode 46 and the fixed electrode 44, whereby performing the spot-welding on the n-th target position $B_n$. The processor 18 repeatedly performs the spot-welding work for all the target positions $B_n$.

The processor 18 carries out a series of operations for such a spot-welding work in accordance with a work program. This work program is constructed by e.g. teaching the movement machine 14 the operation to position the tool 16 to the n-th teaching point $C_n$, and pre-stored in the storage 20. The work program includes e.g. position information of the n-th teaching point $C_n$ (coordinates in the movement machine coordinate system $C_M$), a positioning command for positioning the tool 16 at the n-th teaching point $C_n$, and a welding start command for causing the movable electrode 46 and the fixed electrode 44 to perform the spot-welding.

When the processor 18 carries out the operation to hold the n-th target position $B_n$ between the movable electrode 46 and the fixed electrode 44 in accordance with the work program, a working position where the movable electrode 46 and the fixed electrode 44 actually contact the workpiece W may deviate from the n-th target position $B_n$. Such a deviation is caused by a minute vibration generated in the tool 16 by acceleration or deceleration when the tool 16 is moved by the movement machine 14, for example.

In the present embodiment, the processor 18 acquires a deviation amount of the working position of the tool 16 with respect to the n-th target position $B_n$. Hereinafter, the operation to acquire the deviation amount in the machine system 10 will be described. As a preparatory stage for the operation to acquire the deviation amount, the operator marks each of the n-th target positions $B_n$ of the workpiece W.

This mark is e.g. an engraved mark, seal, or paint provided on the workpiece W, and is for making the n-th target position $B_n$ be visually depicted in an image imaged by the camera 17. Note that, when a visible feature (a corner, a recess, or the like) is present on the n-th target position $B_n$, the mark may be omitted.

After the workpiece W is set at a predetermined position relative to the movement machine 14, the processor 18 operates the movement machine 14 in accordance with the work program so as to move the tool 16 toward the n-th teaching point $C_n$. Then, the processor 18 causes the camera 17 to image the n-th target position $B_n$ at a time point $\tau_n$ when the processor 18 causes the tool 16 to perform the operation for the spot-welding work on the n-th target position $B_n$.

As an example, the time point $\tau_n$ for imaging by the camera 17 is set to a time point when causing the movable electrode 46 and the fixed electrode 44 of the tool 16 to contact the workpiece W. The time point when the movable electrode 46 and the fixed electrode 44 contact the workpiece W can be predicted. Specifically, the processor 18 receives a welding start command from the work program and transmits to the servo motor 38 a command for moving the movable electrode 46 toward the fixed electrode 44.

A time $\tau_x$ from the time when the processor 18 transmits the command to the servo motor 38 to the time when the servo motor 38 moves the movable electrode 46 and holds the workpiece W between the movable electrode 46 and the fixed electrode 44 can be predicted from e.g. the acceleration and deceleration characteristics of the servo motor 38. Therefore, the time point $\tau_n$ when the movable electrode 46 and the fixed electrode 44 contact the workpiece W can be determined as a time point when the time $\tau_x$ elapses from the time point when the processor 18 transmits the command to the servo motor 38.

As another example, the time point $\tau_n$ for imaging by the camera 17 may be set to a time point when the processor 18 receives the welding start command from the work program and transmits the command for moving the movable electrode 46 to the servo motor 38. As yet another example, the time point $\tau_n$ for imaging by the camera 17 can be set to a time point when causing the movable electrode 46 and the fixed electrode 44, which hold the workpiece W therebetween, to be energized. For example, the time point for energizing is a time point when the processor 18 transmits a voltage supply command to a voltage source (not illustrated) which supplies voltage to the movable electrode 46 and the fixed electrode 44 (or, a time point when a predetermined time elapses from the time point at which the processor 18 transmits the voltage supply command to the voltage source). The time point $\tau_n$ for imaging by the camera 17 is determined by an operator.

In the present embodiment, the processor 18 does not actually move the movable electrode 46 toward the fixed electrode 44 at this time point $\tau_n$. For example, the processor 18 may be configured to recognize only the timing of transmitting a command for moving the movable electrode 46, instead of actually transmitting the command to the servo motor 38. Alternatively, the processor 18 may transmit a pseudo-command to the servo motor 38 that does not actually operate the servo motor 38.

Figure 5:
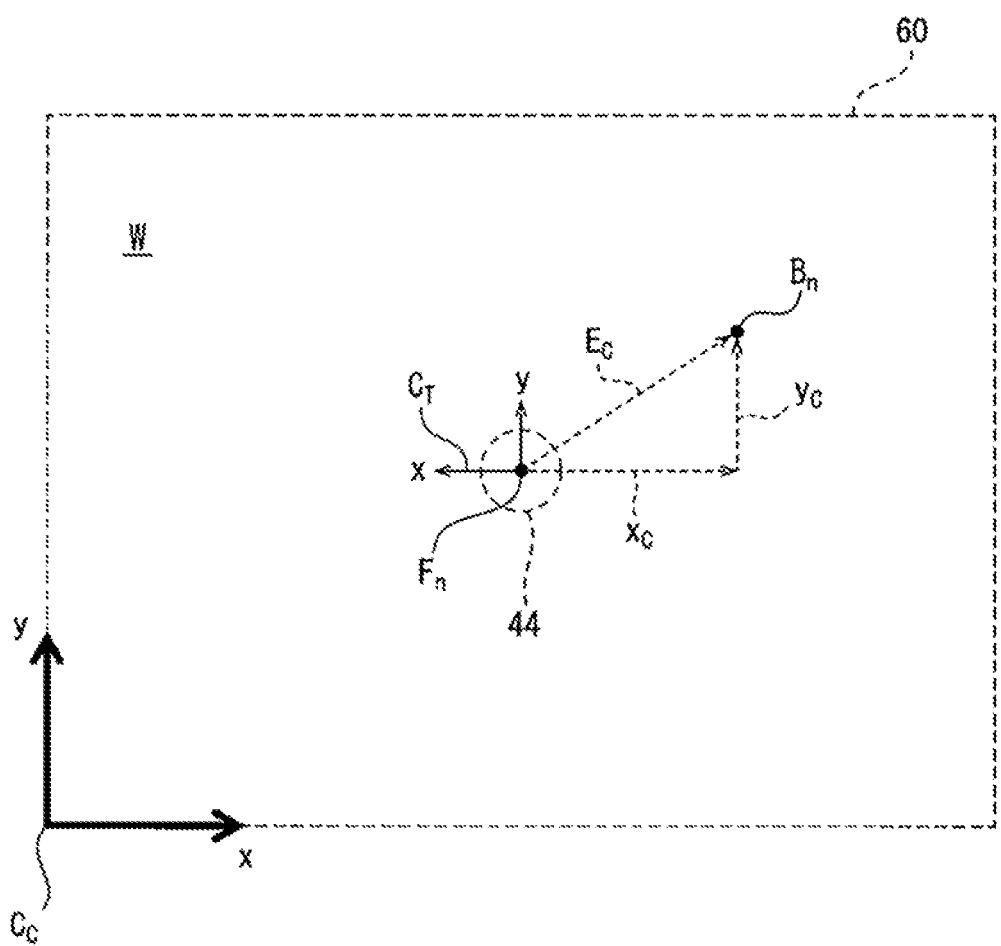
FIG. 5 illustrates an example of an image data imaged by a camera illustrated in FIG. 3.

FIG. 5 illustrates an example of an image data imaged by the camera 17 at the time point $\tau_n$. In the image data 60 illustrated in FIG. 5, the n-th target position $B_n$ on the workpiece W is depicted. Note that, in FIG. 5, the fixed electrode 44 present on back side of the workpiece W is indicated by a dotted line for reference, and the tool coordinate system $C_T$ is also illustrated.

As described above, in the present embodiment, the camera 17 is arranged such that the visual line direction D thereof coincides with the axis A. In this case, the fixed electrode 44 (or the origin of the tool coordinate system $C_T$) is disposed at the center of the image data 60. Therefore, in the image data 60, a center point (central pixel) $F_n$ can be regarded as the working position where the movable electrode 46 and the fixed electrode 44 contact the workpiece W and holds it therebetween when the movable electrode 46 is moved to the fixed electrode 44 during the actual spot-welding work.

The storage 20 pre-stores the coordinates of the center point $F_n$ in the camera coordinate system $C_c$ as information indicating the position of the working position in the image data 60. In the image data 60, the n-th target position $B_n$ deviates from the center point (i.e., the working position of the tool 16) F by a difference $x_c$ in the x-axis positive direction and a difference $y_c$ in the y-axis positive direction of the camera coordinate system $C_c$. In other words, in the image data 60, the n-th target position $B_n$ deviates from the working position $F_n$ by a difference $E_c$ ($|E_c|=(x_c^2+y_c^2)^{1/2}$). These differences $x_c$, $y_c$ and $E_c$ are vectors.

The processor 18 analyzes the image data 60 received from the camera 17, and acquires the coordinates in the camera coordinate system $C_c$ of one pixel that depicts the n-th target position $B_n$ (e.g., one pixel at the center of the image area of the n-th target position $B_n$). The processor 18 obtains the differences $x_c$ and $y_c$ (or $E_c$) in the camera coordinate system $C_c$ using the coordinates of the n-th target position $B_n$ and the pre-stored coordinates of the working position (center point) $F_n$ in the camera coordinate system $C_c$, and acquires a deviation amount between the working position $F_n$ and the n-th target position $B_n$ in the tool coordinate system $C_T$, using the differences $x_c$ and $y_c$ (or $E_c$) and the known positional relationship between the tool coordinate system $C_T$ and the camera coordinate system $C_c$.

Since the camera 17 and the tool 16 are arranged in the known positional relationship with each other, each parameter of a first conversion matrix (e.g., a homogeneous conversion matrix) that represents the positional relationship between the tool coordinate system $C_T$ and the camera coordinate system $C_c$ can be determined by calibrating the tool coordinate system $C_T$ and the camera coordinate system $C_c$ with respect to each other. By this calibration, the coordinates in the tool coordinate system $C_T$ and the coordinates in the camera coordinate system $C_c$ can be mutually converted via the first conversion matrix.

The processor 18 converts the differences $x_c$ and $y_c$ or the difference $E_c$ in the camera coordinate system $C_c$ into deviation amounts $x_T$ and $y_T$ or a deviation amount $E_T$ in the tool coordinate system $C_T$ using the first conversion matrix. These deviation amounts $x_T$, $y_T$ and $E_T$ are vectors. In this way, the processor 18 can acquire the deviation amounts $x_T$ and $y_T$ (or deviation amount $E_T$) between the working position $F_n$ and the n-th target position $B_n$ in the tool coordinate system $C_T$ at the time point $\tau_n$.

As described above, the processor 18 acquires the deviation amounts $x_T$ and $y_T$ (or deviation amount $E_T$) between the working position $F_n$ and the n-th target position $B_n$ at the time point $\tau_n$, based on the position of the n-th target position $B_n$ in the image data 60 and the position of the working position $F_n$ determined in the image data 60. Therefore, in the present embodiment, the processor 18 functions as a deviation amount acquisition section 52.

The thus-acquired deviation amounts $x_T$ and $y_T$ (or deviation amount $E_T$) are data accurately representing the deviation amount between the target position $B_n$ and the working position $F_n$ at the time point $\tau_n$ when causing the tool 16 to perform the operation for the spot-welding work (e.g., command to the servo motor 38, contact of the movable electrode 46 with the workpiece W, and energization to the movable electrode 46 and the fixed electrode 44), not at the time point when the tool 16 is arranged at the n-th teaching point $C_n$.

Then, the processor 18 corrects the position of the movement machine 14 such that the working position $F_n$ is arranged at the n-th target position $B_n$ at the time point $\tau_n$, based on the acquired deviation amounts $x_T$ and $y_T$ (or deviation amount $E_T$). Specifically, in the example illustrated in FIG. 5, the processor 18 automatically corrects the n-th teaching point $C_n$ defined in the work program to a position moved in the x-axis negative direction of the tool coordinate system $C_T$ by the deviation amount $x_T$ and in the y-axis positive direction of the tool coordinate system $C_T$ by the deviation amount $y_T$. Alternatively, the processor 18 corrects the n-th teaching point $C_n$ to a position moved by the deviation amount $E_T$ in the tool coordinate system $C_T$.

In this manner, the processor 18 corrects the position information of the n-th teaching point $C_n$ that has been included in the work program, thereby updating the work program. Therefore, the processor 18 functions as a position correction section 54 (FIG. 1) configured to correct the position (n-th teaching point $C_n$) of the movement machine 14.

As described above, in the present embodiment, the deviation amount $x_T$, $y_T$, $E_T$ of the working position $F_n$ of the tool 16 with respect to the n-th target position $B_n$ are acquired by the camera 17 that images the n-th target position $B_n$ at the time point $\tau_n$, and by the deviation amount acquisition section 52 that acquires the deviation amount $x_T$, $y_T$, $E_T$. Therefore, the camera 17 and the deviation amount acquisition section 52 constitute a device 50 (FIG. 1) configured to acquire the deviation amount $x_T$, $y_T$, $E_T$ of the working position $F_n$ of the tool 16 with respect to the n-th target position $B_n$.

According to this device 50, it is possible to automatically and accurately obtain, from the image data 60, the deviation amount $x_T$, $y_T$, $E_T$, between the n-th target position $B_n$ on the workpiece W and the working position $F_n$ where the tool 16 is estimated to actually work on the workpiece W, without the operator manually measuring it.

Further, in the present embodiment, the storage 20 constitutes the device 50 and pre-stores the coordinates of the center point $F_n$ in the camera coordinate system $C_c$ as the information indicating the position of the working position $F_n$ in the image data 60. According to this configuration, since it is not necessary to set or detect the position of the working position $F_n$ every time, the deviation amount $x_T$, $y_T$, $E_T$ can be quickly acquired by a relatively simple algorithm.

Further, in the present embodiment, the position correction section 54 constitutes the device 50 and corrects the position (n-th teaching point $C_n$) of the movement machine 14 based on the acquired deviation amounts $x_T$ and $y_T$ (or deviation amount $E_T$). According to this configuration, when the processor 18 performs a series of operations for the spot-welding work in accordance with the updated work program, it is possible to accurately position the working position $F_n$ (i.e., holding position by the movable electrode 46 and the fixed electrode 44) of the tool 16 at the target position $B_n$. Further, since it is possible to omit a work by the operator to manually correct the teaching point $C_n$, the process required for teaching the movement machine 14 can be reduced.

Further, in the present embodiment, the processor 18 functions as the deviation amount acquisition section 52 to obtain the differences $x_c$ and $y_c$ (or difference $E_c$) in the camera coordinate system $C_c$ and acquire the deviation amounts $x_T$ and $y_T$ (or deviation amount $E_T$) in the tool coordinate system $C_T$ using the differences $x_c$ and $y_c$ (or difference $E_c$) and the known positional relationship (specifically, the first conversion matrix) between the tool coordinate system $C_T$ and the camera coordinate system $C_c$ (specifically, the first conversion matrix). According to this configuration, the deviation amounts $x_T$ and $y_T$ (or deviation amount $E_T$) in the control coordinate system can be accurately acquired from the image data 60.

Further, in the present embodiment, the camera 17 is disposed at the position on the movable electrode 46 such that the visual line direction D thereof coincides with the axis A (i.e., the z-axis of the tool coordinate system). In this case, the working position $F_n$ of the tool 16 is arranged at the center point $F_n$ of the image data 60 imaged by the camera 17.

According to this configuration, when the operator view the image data 60, the operator can intuitively recognize the magnitude and direction of the deviation of the working position $F_n$ from the n-th target position $B_n$. Further, when calibrating the tool coordinate system $C_T$ and the camera coordinate system $C_c$, only the parameter of the visual line direction D (z-axis of the tool coordinate system) needs to be considered, so the calibration work can be simplified.

However, the installation position of the camera 17 is not limited to that in the embodiment illustrated in FIG. 3 (i.e., the position of the movable electrode 46). Another example of the installation position of the camera 17 relative to the tool 16 will be described below with reference to FIG. 6. In the embodiment illustrated in FIG. 6, the camera 17 is attached to the base 32 via an attachment tool 62 so as to be arranged in a predetermined positional relationship with the tool 16.

Specifically, the camera 17 is fixed with respect to the tool 16 such that the visual line direction D thereof is parallel to the axis A and offset by a predetermined distance from the axis A, and that the fixed electrode 44 is included in a field of view of the camera 17. FIG. 7 illustrates an example of image data captured by the camera 17 illustrated in FIG. 6 that images the n-th target position $B_n$ at the time point $\tau_n$ when causing the tool 16 to perform the operation for the spot-welding work.

In the image data 64 illustrated in FIG. 7, the working position $F_n$ (or the origin of the tool coordinate system $C_T$), where the movable electrode 46 and the fixed electrode 44 contact and hold the workpiece W when the movable electrode 46 is moved to the fixed electrode 44 during the actual spot-welding work, deviates from the center (i.e., the visual line direction D) of the image data 64.

The position of the working position $F_n$ in the image data 64 at this time is determined in response to the positional relationship between the camera 17 (specifically, the visual line direction D) and the tool 16 (specifically, the fixed electrode 44, or the origin of the tool coordinate system $C_T$). The storage 20 pre-stores therein the coordinates of the working position $F_n$ in the camera coordinate system $C_c$ as information indicating the position of the working position $F_n$ in the image data 64.

The processor 18 analyzes the image data 64 imaged by the camera 17, acquires coordinates in the camera coordinate system $C_c$ of one pixel that depicts the n-th target position $B_n$, and obtains the differences $x_c$ and $y_c$ (or difference $E_c$) in the camera coordinate system $C_c$, using the acquired coordinates and pre-stored coordinates of the working position $F_n$.

Figure 6:
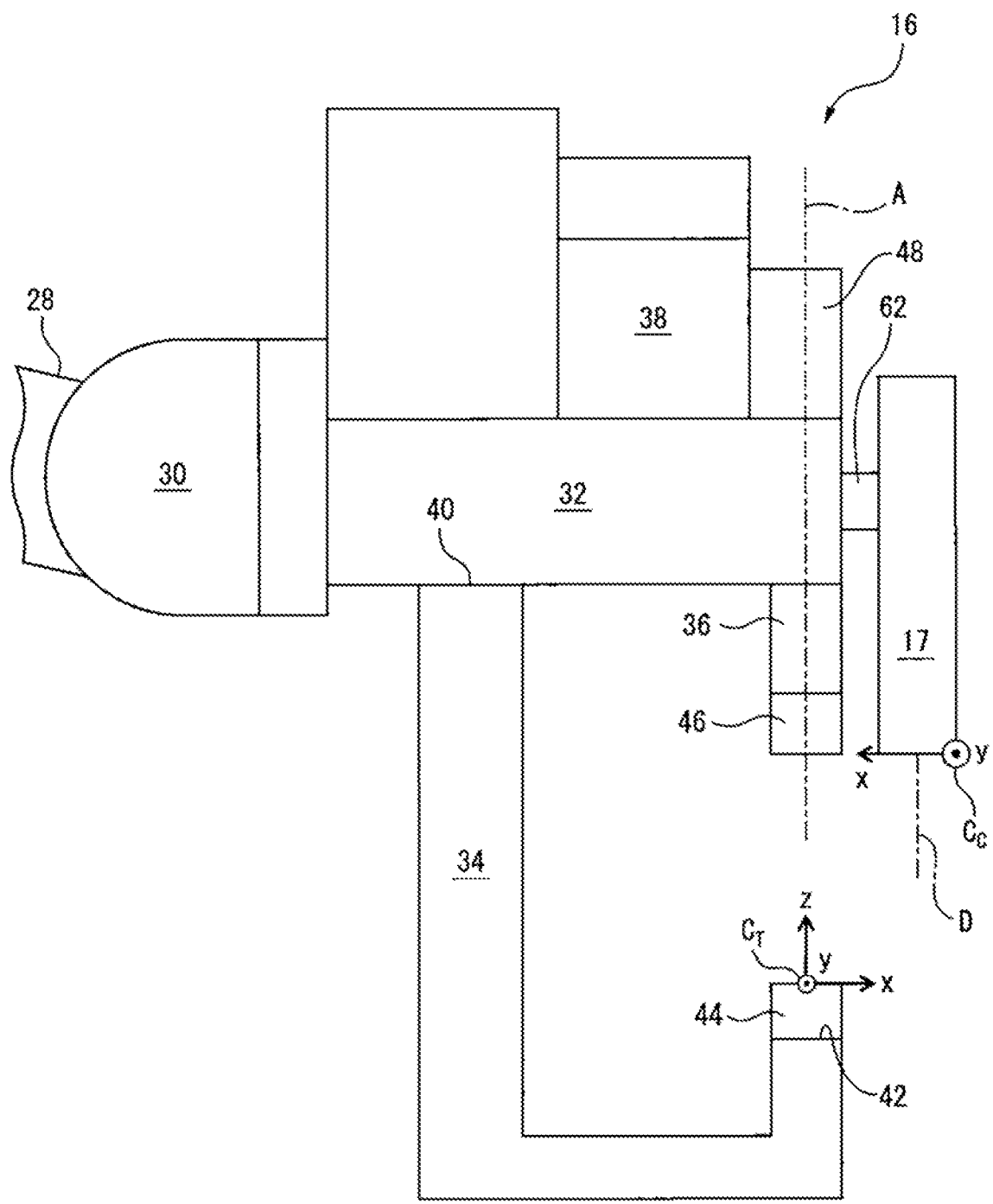
FIG. 6 illustrates another example of a positional relationship between the tool and the camera.
Figure 7:
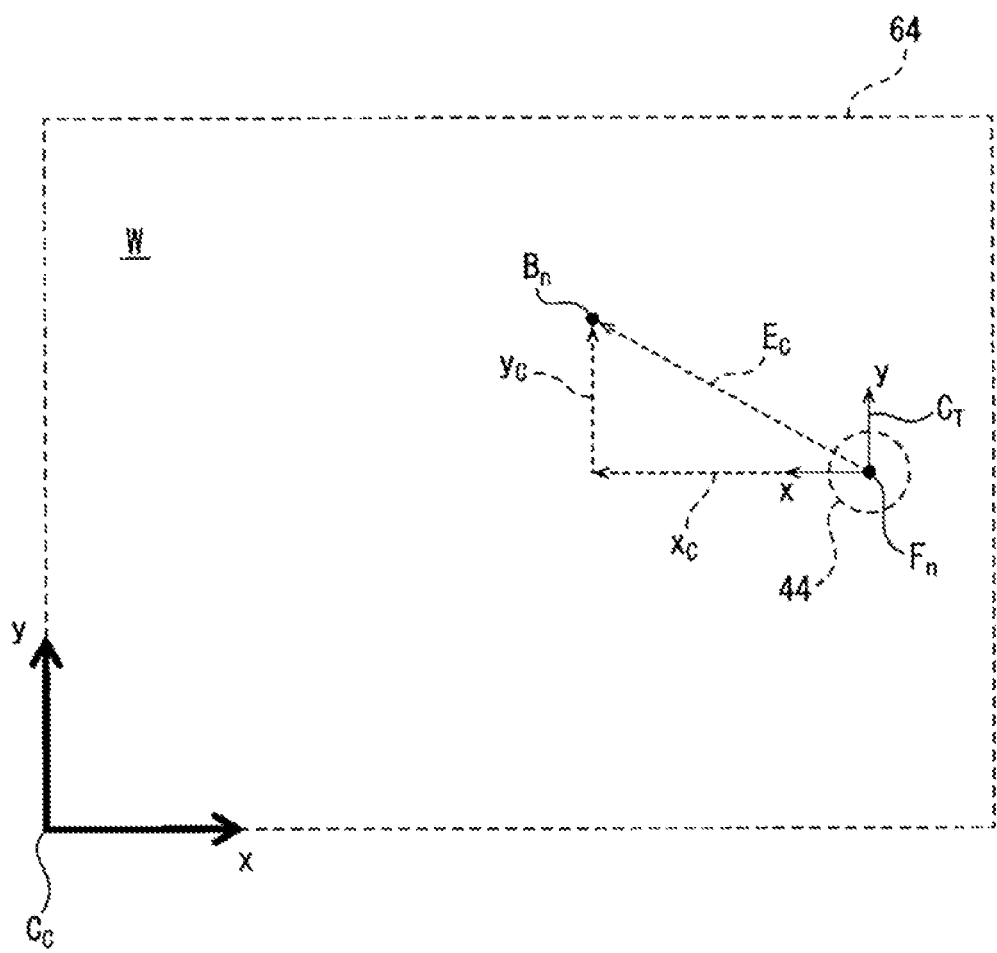
FIG. 7 illustrates an example of an image data imaged by a camera illustrated in FIG. 6.

Since the camera 17 and the tool 16 illustrated in FIG. 6 are arranged in the known positional relationship with each other, each parameter of a second conversion matrix (e.g., a homogeneous conversion matrix) representing the positional relationship between the tool coordinate system $C_T$ and the camera coordinate system $C_c$ in FIG. 6 can be obtained by calibrating the tool coordinate system $C_T$ and the camera coordinate system. By this calibration, the coordinates in the tool coordinate system $C_T$ and the coordinates in the camera coordinate system $C_c$ can be mutually converted via the second conversion matrix.

The processor 18 converts the differences $x_c$ and $y_c$ or the difference $E_c$ in the camera coordinate system $C_c$ into the deviation amounts $x_T$ and $y_T$ or the deviation amount $E_T$ in the tool coordinate system $C_T$ using the second conversion matrix. Thus, the processor 18 can acquire the deviation amounts $x_T$ and $y_T$ (or deviation amount $E_T$) between the working position $F_n$ and the n-th target position $B_n$ at the time point $\tau_n$.

Figure 8:
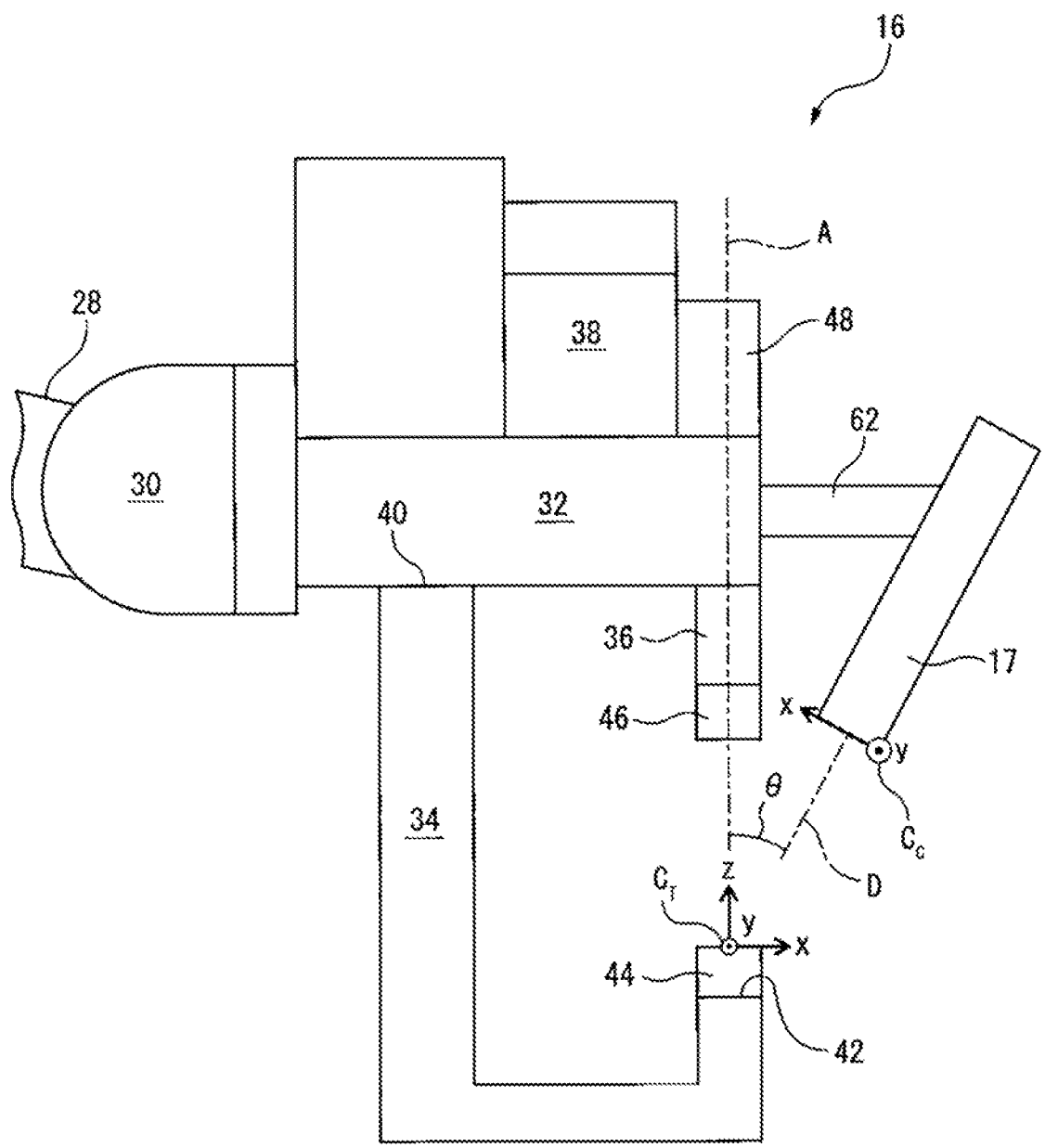
FIG. 8 illustrates yet another example of the positional relationship between the tool and the camera.
Figure 9:
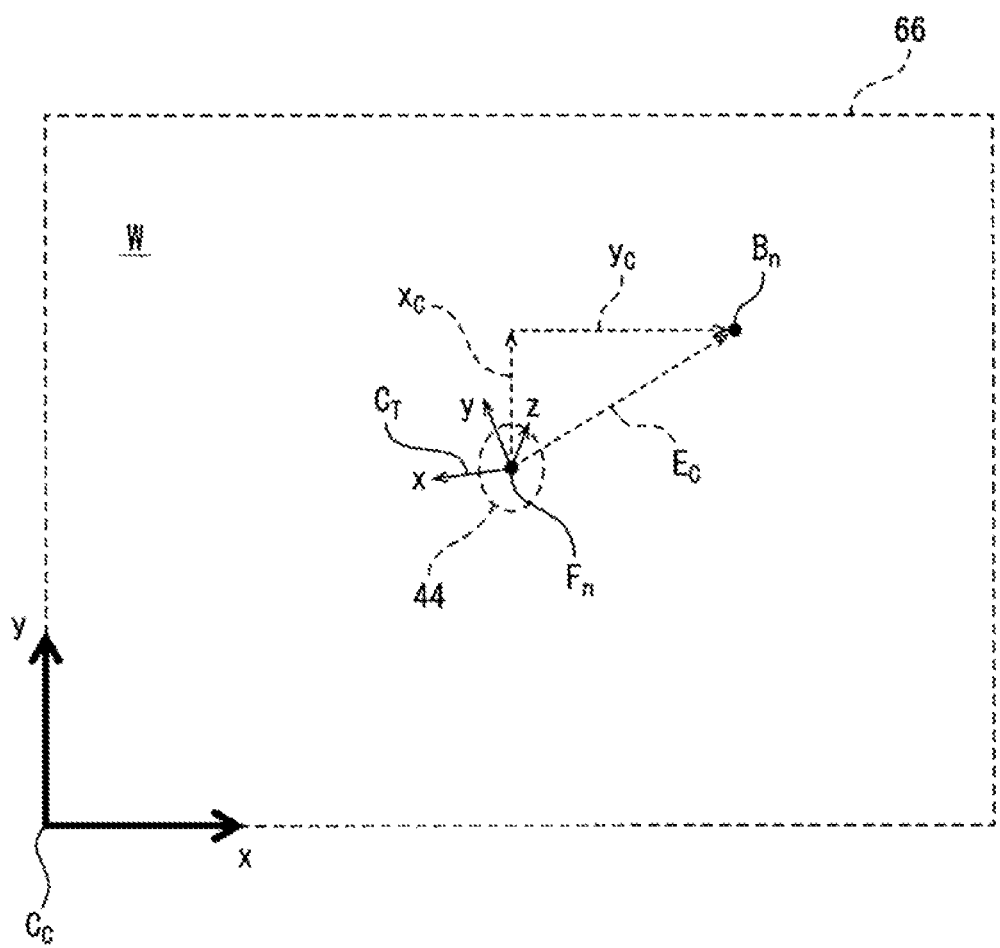
FIG. 9 illustrates an example of an image data imaged by the camera illustrated in FIG. 8.

FIG. 8 illustrates yet another example of the installation position of the camera 17 relative to the tool 16. In the embodiment illustrated in FIG. 8, the camera 17 is fixed in a positional relationship with the tool 16 in which the visual line direction D of the camera 17 is inclined with respect to the axis A by a predetermined angle θ and the fixed electrode 44 is included in the field of view of the camera 17. FIG. 9 illustrates an example of image data captured by the camera 17 illustrated in FIG. 8 imaging the n-th target position $B_n$ at the time point $\tau_n$ when causing the tool 16 to perform the operation for the spot-welding work.

The position of the working position $F_n$ (or the origin of the tool coordinate system $C_T$) in an image data 66 illustrated in FIG. 9 is determined in response to the positional relationship between the camera 17 and the tool 16. For example, when the camera 17 is positioned in a positional relationship with the tool 16 in which the visual line direction D thereof passes the origin of the tool coordinate system $C_T$, the center point $F_n$ of the image data 66 can be regarded as the working position $F_n$. The storage 20 pre-stores therein the coordinates of the working position $F_n$ in the camera coordinate system $C_c$ as information indicating the position of the working position $F_n$ in the image data 66.

The processor 18 analyzes the image data 66 imaged by the camera 17, acquires coordinates in the camera coordinate system $C_c$ of one pixel that depicts the n-th target position $B_n$, and obtains the differences $x_c$ and $y_c$ (or difference $E_4$) in the camera coordinate system $C_c$, using the acquired coordinates and the pre-stored coordinates of the working position $F_n$.

Since the camera 17 and the tool 16 illustrated in FIG. 8 are arranged in a known positional relationship with each other, each parameter of a third conversion matrix (e.g., a homogeneous conversion matrix) representing the positional relationship between the tool coordinate system $C_T$ and the camera coordinate system $C_c$ in FIG. 8 can be acquired by calibrating the tool coordinate system $C_T$ and the camera coordinate system. By this calibration, the coordinates in the tool coordinate system $C_T$ and the coordinates in the camera coordinate system $C_c$ can be mutually converted via the third conversion matrix.

The processor 18 converts the differences $x_c$ and $y_c$ or difference $E_c$ in the camera coordinate system $C_c$ into the deviation amounts $x_T$ and $y_T$ or the deviation amount $E_T$ in the tool coordinate system $C_T$, using the third conversion matrix. Thus, the processor 18 can acquire the deviation amounts $x_T$ and $y_T$ (or deviation amount $E_T$) between the working position $F_n$ and the n-th target position $B_n$ at the time point $\tau_n$.

Figure 10:
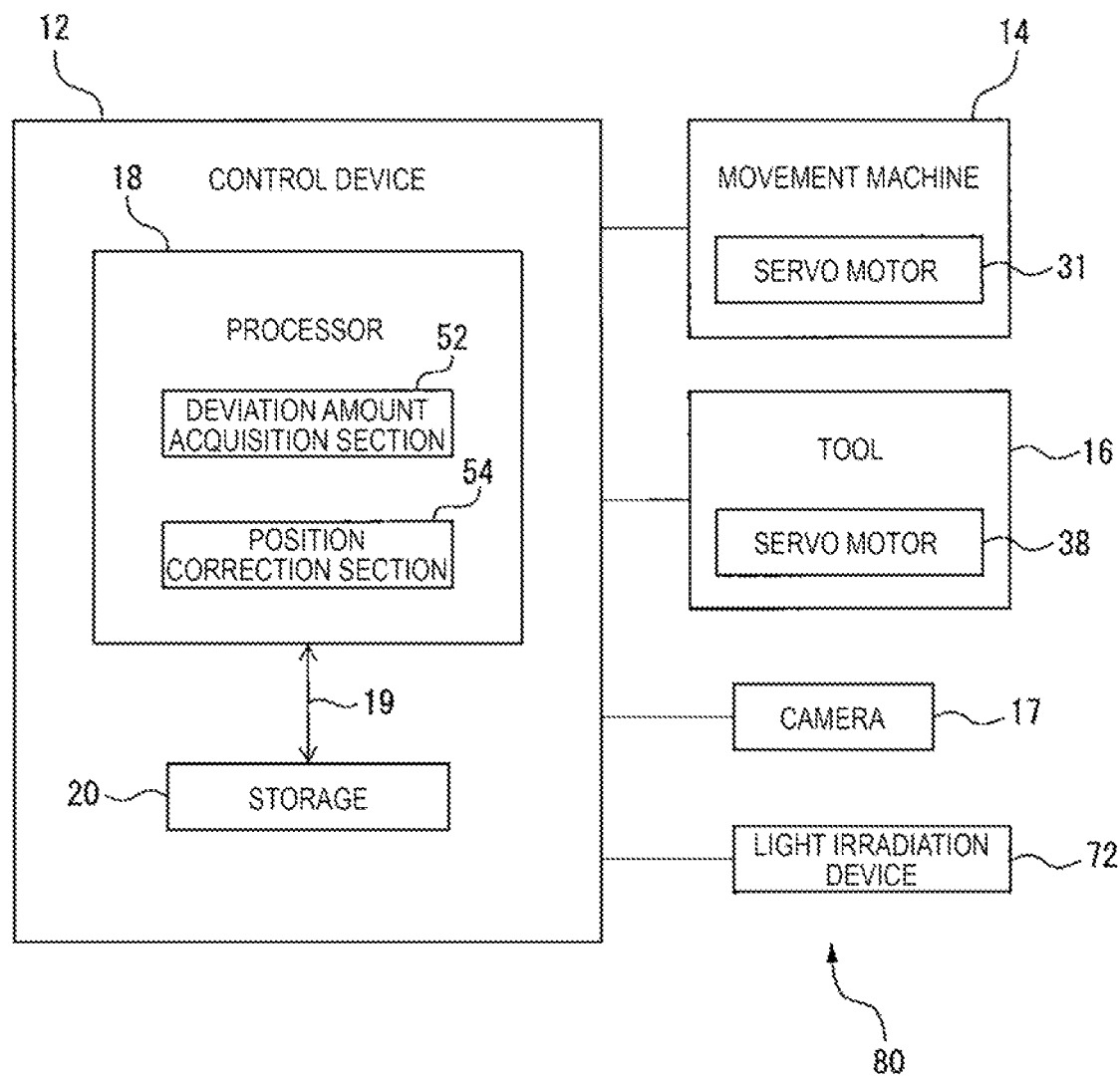
FIG. 10 is a block diagram of a machine system according to another embodiment.

Next, a machine system 70 according to another embodiment will be described with reference to FIG. 10 and FIG. 11. The machine system 70 differs from the machine system 10 described above in that the machine system 70 further includes a light irradiation device 72. The positional relationship between the camera 17 and the tool 16 in the present embodiment is the same as that in the embodiment illustrated in FIG. 6.

The light irradiation device 72 is e.g. a laser pointer, and outputs light (e.g., laser beam) traveling straight along an optical axis O. The light irradiation device 72 is disposed at a position on the movable electrode 46 such that the optical axis O of the light irradiation device 72 coincides with the axis A (or the z-axis of the tool coordinate system $C_T$). In the state illustrated in FIG. 11, the movable arm 36 is disposed stationary at a predetermined position (e.g., a retracted position farthest away from the fixed electrode 44) in the direction of the axis A.

Next, an operation of acquiring the deviation amount $x_T$, $y_T$, $E_T$ in the machine system 70 will be described. The processor 18 operates the movement machine 14 in accordance with the work program so as to move the tool 16 to the n-th teaching point $C_n$, and causes the camera 17 to image the n-th target position $B_n$, which is visible by a mark or the like, at the time point $\tau_n$ when causing the tool 16 to perform the operation for the spot-welding work.

Figure 12:
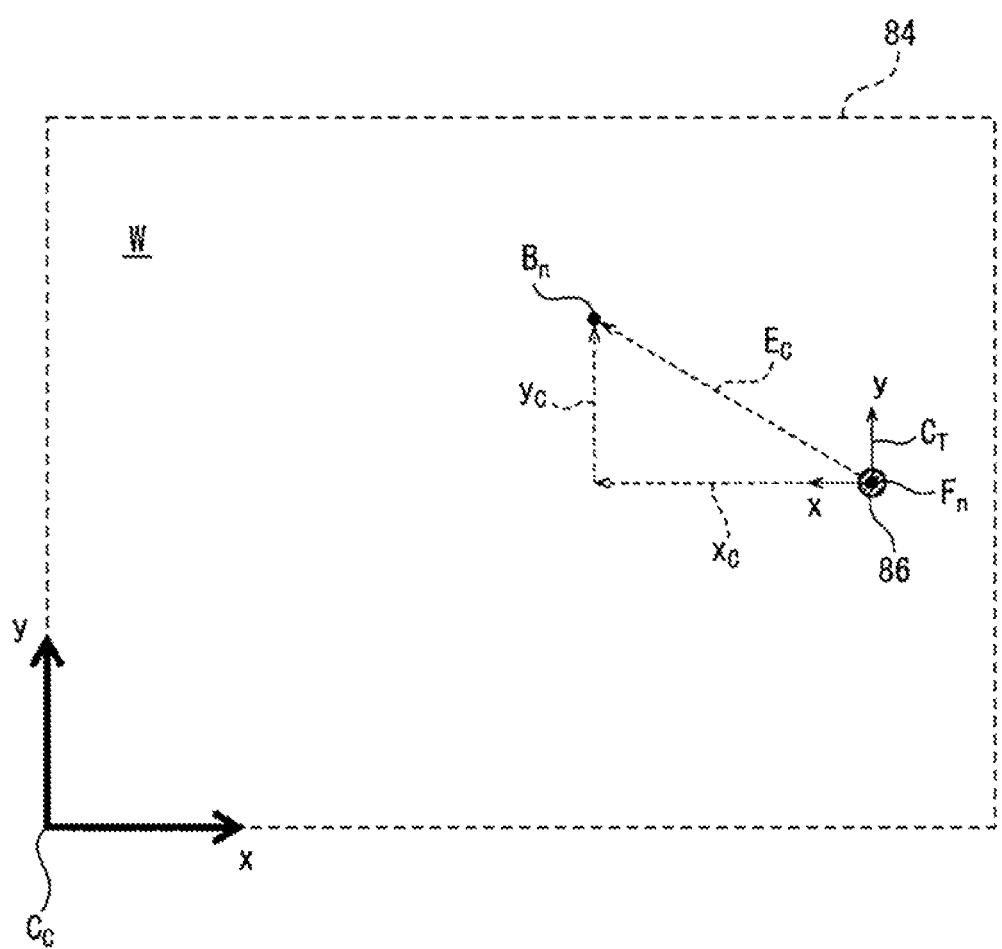
FIG. 12 illustrates an example of an image data imaged by the camera illustrated in FIG. 11.

In the present embodiment, the processor 18 operates the light irradiation device 72 so as to output light before imaging the n-th target position $B_n$ with the camera 17. FIG. 12 illustrates an example of image data imaged by the camera 17 at the time point $\tau_n$. In an image data 84 illustrated in FIG. 12, light 86 emitted from the light irradiation device 72 onto the surface of the workpiece W is depicted together with the n-th target position $B_n$ on the workpiece W.

Since the optical axis O of the light irradiation device 72 is arranged so as to coincide with the axis A (z-axis of the tool coordinate system $C_T$), the position of the light 86 in the image data 84 can be regarded as indicating the working position $F_n$ where the movable electrode 46 and the fixed electrode 44 contact the workpiece W and hold the workpiece W therebetween during the actual spot-welding work.

The processor 18 acquires the coordinates in the camera coordinate system $C_c$ of one pixel that depicts the light 86 (e.g., a pixel at the center of the image region of light 86) in the image data 84, and stores the coordinates in the storage 20 as information indicating the position of the working position $F_n$ in the image data 84. Further, the processor 18 analyzes the image data 84 imaged by the camera 17, and acquires the coordinates in the camera coordinate system $C_c$ of the one pixel that depicts the n-th target position $B_n$. Then, the processor 18 obtains the differences $x_c$ and $y_c$ (or difference $E_c$) in the camera coordinate system $C_c$ using the coordinates of the working position $F_n$ acquired from the light 86 depicted on the image data 84 and the coordinates of the n-th target position $B_n$.

Figure 11:
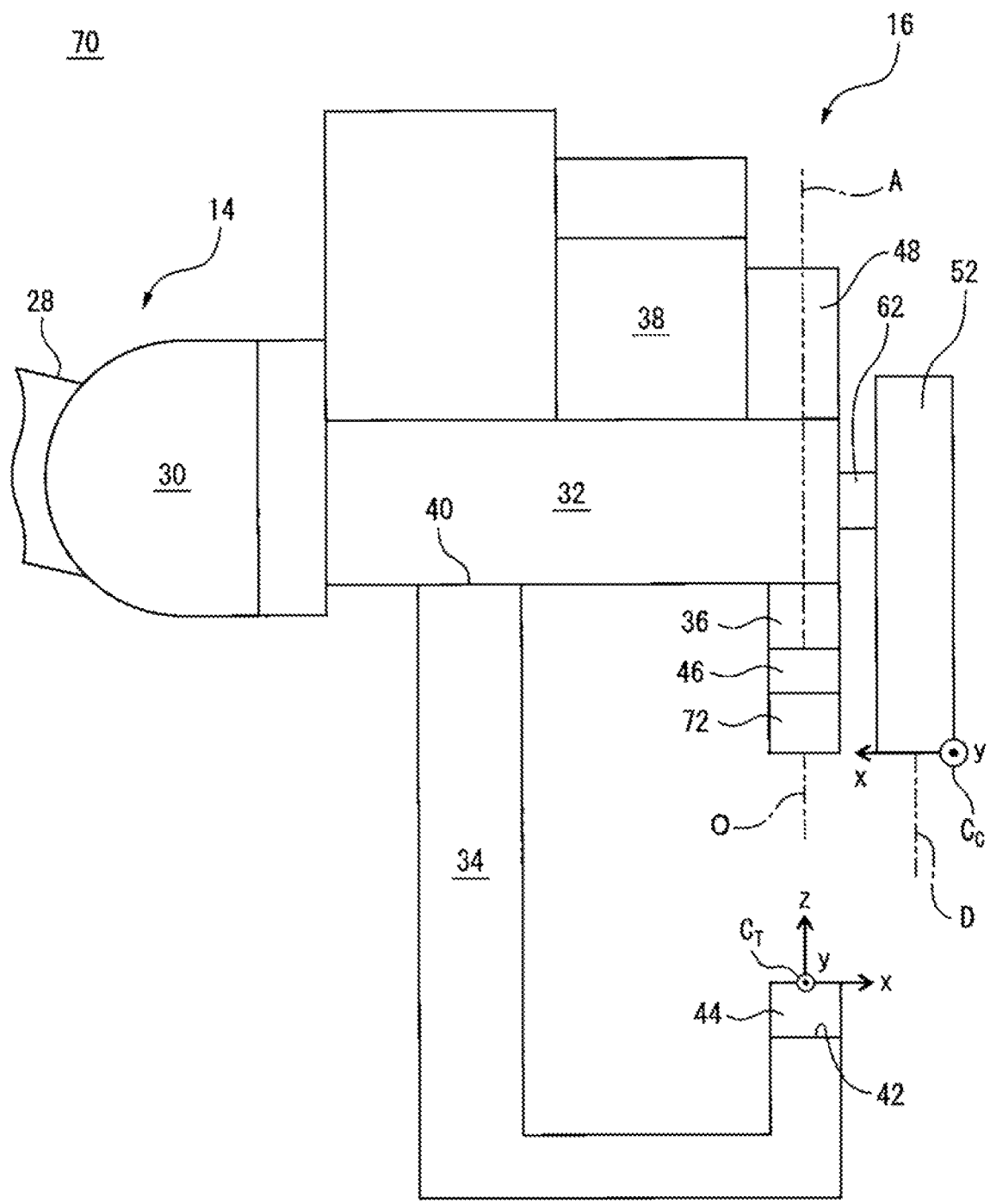
FIG. 11 is an enlarged diagram of a tool, a camera, and a light irradiation device illustrated in FIG. 10.

Then, the processor 18 converts the differences $x_c$ and $y_c$ or the difference $E_c$ in the camera coordinate system $C_c$ into the deviation amounts $x_T$ and $y_T$ or the deviation amount $E_T$ in the tool coordinate system $C_T$, using the second conversion matrix representing the positional relationship between the tool coordinate system $C_T$ and the camera coordinate system $C_c$ in FIG. 11. Thus, the processor 18 can acquire the deviation amounts $x_T$ and $y_T$ (or deviation amount $E_T$) between the working position $F_n$ and the n-th target position $B_n$ at the time point $\tau_n$.

In the present embodiment, the camera 17, the storage 20, the deviation amount acquisition section 52, the position correction section 54, and the light irradiation device 72 constitute a device 80 (FIG. 10) configured to acquire the deviation amount $x_T$, $y_T$, $E_T$ of the working position $F_n$ of the tool 16 with respect to the n-th target position $B_n$. The light irradiation device 72 irradiates the workpiece W with light for indicating the working position $F_n$ when the camera 17 images the image data 84.

According to the present embodiment, it is not necessary to prepare in advance the information indicating the position of the working position $F_n$ in the image data 84. Instead, the information indicating the position of the working position $F_n$ in the image data 84 (i.e., the coordinates in the camera coordinate system $C_c$ of the pixel depicting the light 86 in the image data 84) can be automatically acquired from the light 86 depicted in the image data 84.

Note that, in the above-described embodiments, the camera 17 may further image the n-th target position $B_n$ at a time point $\tau_n$−t which is before the time point $\tau_n$ by time t, or at a time point $\tau_n$+t which is after the time point $\tau_n$ by time t. In other words, the camera 17 may continuously images (i.e., capture moving image of) the n-th target position $B_n$ at a plurality of time points $\tau_n$−t, $\tau_n$, $\tau_n$+t, which are consecutive in time series with a period t and which includes the time point $\tau_n$. The period t of continuous shooting can be determined depending on the optical specifications of the camera 17.

Figure 13:
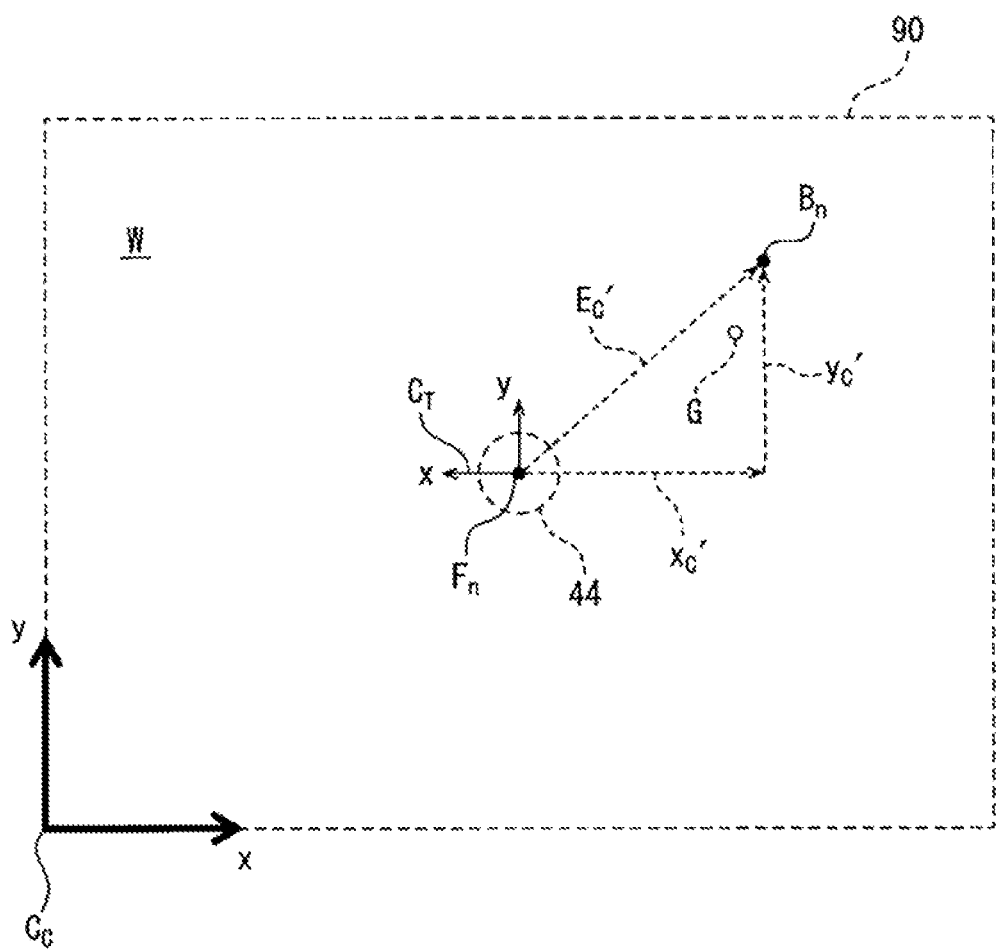
FIG. 13 illustrates another example of an image data imaged by the camera illustrated in FIG. 3.
Figure 14:
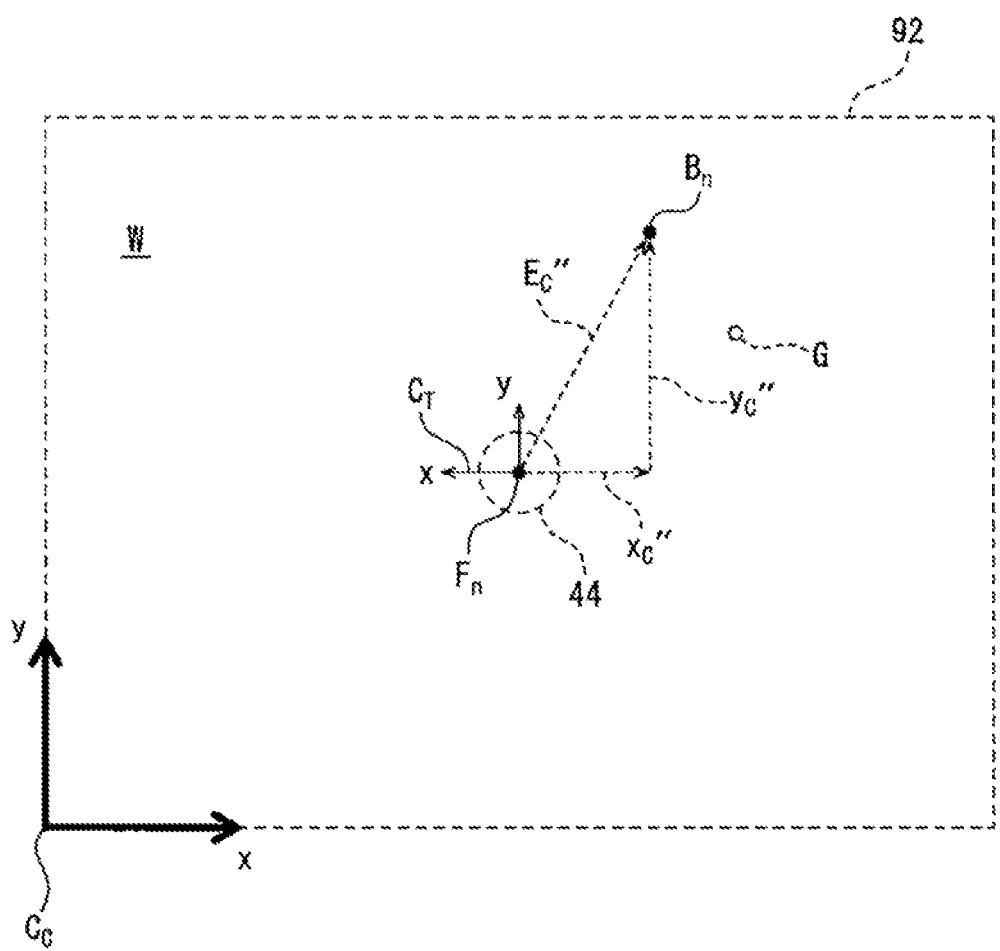
FIG. 14 illustrates yet another example of an image data imaged by the camera illustrated in FIG. 3.

Hereinafter, a case will be described where the camera 17 in the embodiment illustrated in FIG. 3 continuously images the n-th target position $B_n$ at the time points $\tau_n$−t, $\tau_n$, and $\tau_n$+t. FIG. 13 illustrates an example of image data captured by imaging the n-th target position $B_n$ at the time point $\tau_n$−t. FIG. 14 illustrates an example of image data captured by imaging the n-th target position $B_n$ at the time point $\tau_n$+t. Further, in FIG. 13 and FIG. 14, the position of the n-th target position $B_n$ in the image data 60 illustrated in FIG. 5 is indicated by a white point G for reference.

As illustrated in FIG. 13, in an image data 90 imaged by the camera 17 at the time point $\tau_n$−t, the n-th target position $B_n$ deviates from the center point (i.e., the working position) $F_n$ of the image data 90 by a difference $x_c'$ in the x-axis positive direction and a difference $y_c'$ in the y-axis positive direction of the camera coordinate system $C_c$. In other words, the n-th target position $B_n$ deviates from the working position $F_n$, by a difference $E_c'$ ($|E_c'|=(x_c'^2+y_c'^2)^{1/2}$).

The processor 18 acquires the differences $x_c'$ and $y_c'$ or the difference $E_c'$ in the camera coordinate system $C_c$ by the above-described method, and converts the differences $x_c'$ and $y_c'$ or the difference $E_c'$ in the camera coordinate system $C_c$ into deviation amounts $x_T'$ and $y_T'$ or a deviation amount $E_T'$ in the tool coordinate system $C_T$ using the first conversion matrix. Thus, the processor 18 can acquire the deviation amounts $x_T'$ and $y_T'$ (or deviation amount $E_T'$) between the working position $F_n$ and the n-th target position $B_n$ at the time point $\tau_n$−t.

On the other hand, as illustrated in FIG. 14, in an image data 92 imaged by the camera 17 at the time point $\tau_n$+t, the n-th target position $B_n$ deviates from the center point (i.e., the working position) $F_n$ of the image data 92 by a difference $x_c''$ in the x-axis positive direction and a difference $y_c''$ in the y-axis positive direction of the camera coordinate system $C_c$. In other words, the n-th target position $B_n$ deviates from the working position $F_n$, by a difference $E_c''$ ($|E_c''|=(x_c''^2+y_c''^2)^{1/2}$).

The processor 18 acquires the differences $x_c''$ and $y_c''$ or the difference $E_c''$ in the camera coordinate system $C_c$ by the above-described method, and converts the differences $x_c''$ and $y_c''$ or the difference $E_c''$ in the camera coordinate system $C_c$ into deviation amounts $x_T''$ and $y_T''$ or deviation amount $E_T''$ in the tool coordinate system $C_T$. Thus, the processor 18 can acquire the deviation amounts $x_T''$ and $y_T''$ (or deviation amount $E_T''$) between the working position $F_n$ and the n-th target position $B_n$ at the time point $\tau_n$+t. In this way, the deviation amount can differ at the plurality of different time points $\tau_n$−t, $\tau_n$, and $\tau_n$+t. In the present embodiment, the processor 18 acquires the deviation amounts at the plurality of different time points $\tau_n$−t, $\tau_n$, and $\tau_n$+t, respectively.

Here, variations (or error) may occur in the actual dimensions (e.g., thickness) of the workpieces W to be worked. When the dimensions of the workpieces W vary from each other, the time point when the movable electrode 46 and the fixed electrode 44 contact and hold the workpiece W therebetween during the actual spot-welding work may also vary depending on the dimension of the workpiece W.

For example, assume that a nominal dimension of the thickness of the workpiece W is $a_0$, the dimensional tolerance is ±0.1, and the time point $\tau_n$ is set as a time when the movable electrode 46 and the fixed electrode 44 contact the workpiece W having the nominal dimension $a_0$. In this case, if the workpiece W whose actual dimension is $a_0+0.1$ (i.e., thicker than the nominal thickness dimension $a_0$) is held between the movable electrode 46 and the fixed electrode 44, the time point when the movable electrode 46 and the fixed electrode 44 contact this workpiece W is earlier than the time point $\tau_n$.

On the other hand, if the workpiece W whose actual thickness dimension is $a_0-0.1$ (i.e., thinner than the nominal thickness dimension a) is held between the movable electrode 46 and the fixed electrode 44, the time point when the movable electrode 46 and the fixed electrode 44 contact the workpiece W is later than the time point $\tau_n$. Therefore, if the actual thickness dimension of the workpiece W is thinner or thicker than the nominal thickness dimension $a_0$, even if the n-th target position $B_n$ is imaged at the time point $\tau_n$, the n-th target position $B_n$ in the image data at this time may not accurately indicate the actual working position at the time point when the movable electrode 46 and the fixed electrode 44 contact the workpiece W.

In the present embodiment, the camera 17 continuously images (captures moving image of) the n-th target position $B_n$ at the plurality of different time points $\tau_n-t$, $\tau_n$, and $\tau_n+t$, and the processor 18 acquires the deviation amounts $x_T$ and $Y_T$ (or deviation amount $E_T$), $x_T'$ and $y_T'$ (or $E_T'$), and $x_T''$ and $y_T''$ (or $E_T''$), respectively, for each of the acquired image data 60, 90 and 92.

For example, if the time point $\tau_n-t$ corresponds to the time point when the movable electrode 46 and the fixed electrode 44 contact the workpiece W having the dimension of $a_0+0.1$ while the time point $\tau_n+t$ corresponds to the time point when the movable electrode 46 and the fixed electrode 44 contact the workpiece W having the dimension of $a_0-0.1$, the processor 18 can acquire the deviation amounts $x_T$ and $y_T$ (or deviation amount $E_T$) for the workpiece W having the nominal dimension $a_0$, and the deviation amounts $x_T'$ and $y_T'$ (or deviation amount $E_T'$) and the deviation amounts $x_T''$ and $y_T''$ (or deviation amount $E_T''$) for the workpiece W having the dimension of the nominal dimension $a_0$±tolerance.

In this way, by acquiring the deviation amounts from the image data 60, 90, and 92 imaged at a plurality of time points $\tau_n-t$, $\tau_n$, and $\tau_n+t$, it is possible to obtain the deviation amounts corresponding to the variation in the dimension of the workpiece W. As an example, the processor 18 may generate an image indicating following Table 1 and display it on a display (not illustrated) provided at the control device 12.

TABLE 1

| Thickness | Nominal dimension − tolerance | Nominal dimension | Nominal dimension + tolerance |
|---|---|---|---|
| Deviation amount | $x_T'$, $y_T'$ ($E_T'$) | $x_T$, $y_T$ ($E_T$) | $x_T''$, $y_T''$ ($E_T''$) |

With reference to Table 1, the operator can statistically analyze the deviation amount of the working position $F_n$ of the tool 16 with respect to the n-th target position $B_n$ in consideration of the dimensional tolerance. Note that, in the present embodiment, the camera 17 images the n-th target position $B_n$ at three time points $\tau_n-t$, $\tau_n$, and $\tau_n+t$, but the camera 17 may continuously image the n-th target position $B_n$ at more than three time points that includes the time point $\tau_n$ corresponding to the workpiece W with the nominal dimension $a_0$. Due to this, the deviation amount can be analyzed in more detail.

In the above embodiments, the tool 16 is a spot-welding gun, but the tool is not limited thereto. Hereinafter, with reference to FIG. 15, a tool 96 according to another embodiment will be described. The tool 96 is a laser machining head configured to emit a laser beam along an optical axis P to perform laser machining on the workpiece W at a working position $F_n$. The tool 96 is attached to the wrist 30 of the movement machine 14, instead of the above-described tool 16.

The processor 18 transmits a laser oscillation command to a laser oscillator (not illustrated) provided outside the tool 96, and the laser oscillator supplies a laser beam to the tool 96 through a light guide path such as an optical fiber. The tool 96 emits the laser beam from an emission port 96a along the optical axis P to perform the laser machining (laser cutting, laser welding, etc.) on the workpiece W by the emitted laser beam. The tool coordinate system $C_T$ is set for the tool 96. In the present embodiment, the tool coordinate system $C_T$ is set for the tool 96 such that the origin thereof is arranged at the center of the emission port 96a and the z-axis thereof coincides with (or parallel with) the optical axis P.

Figure 4:
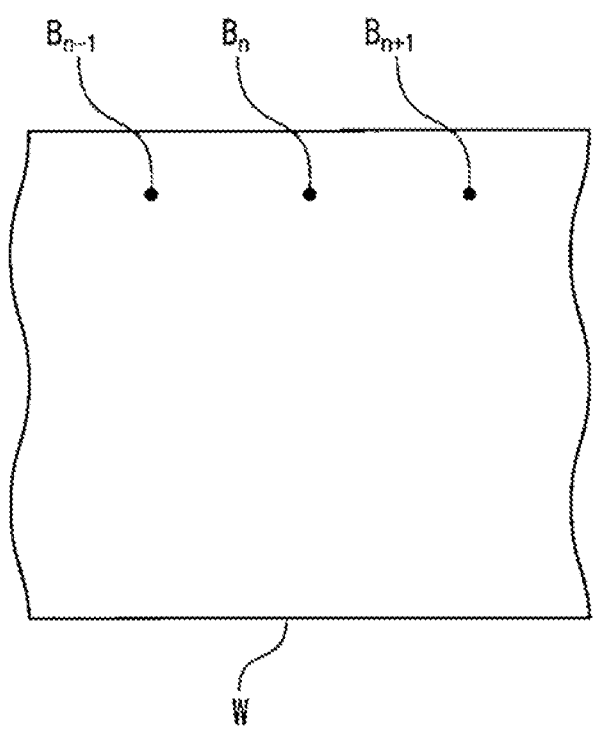
FIG. 4 is a schematic diagram of a workpiece according to an embodiment.

The processor 18 performs the laser machining work on each of the n-th target positions $B_n$ (n=1, 2, . . . ) on the workpiece W illustrated in FIG. 4, for example. Specifically, the processor 18 operates the movement machine 14 so as to position the tool 96 at the n-th teaching point $C_n$ for performing the laser machining work on the n-th target position $B_n$. At this time, the processor 18 sets the tool coordinate system $C_T$ such that the origin thereof is arranged at the n-th teaching point $C_n$ and the z-axis (i.e., the optical axis P) thereof passes through the n-th target position $B_n$.

Then, the processor 18 transmits the laser oscillation command to the laser oscillator for causing the tool 96 to emit the laser beam, and performs the laser machining on the workpiece W at the working position $F_n$ by the laser beam. That is, the working position $F_n$ in this embodiment is a position where the tool 96 irradiates the workpiece W with the laser beam (or the intersection of the optical axis P and the surface of the workpiece W).

The processor 18 repeatedly performs such a laser machining work for all the target positions $B_n$. The processor 18 performs a series of operations for such laser machining work in accordance with a work program. The work program is pre-stored in the storage 20. The work program includes e.g. position information of the n-th teaching point $C_n$, a positioning command for positioning the tool 96 to the n-th teaching point $C_n$, and a laser oscillation command to the laser oscillator.

When the processor 18 arranges the tool 96 at the n-th teaching point $C_n$ in accordance with the work program and performs the operation to output the laser beam from the tool 96, the working position $F_n$, at which the laser beam is actually irradiated on the workpiece W, can deviate from the n-th target position $B_n$. Therefore, the device 50 acquires the deviation amount of the working position $F_n$ of the tool 96 with respect to the n-th target position $B_n$, similar as in the above-described embodiment.

Figure 15:
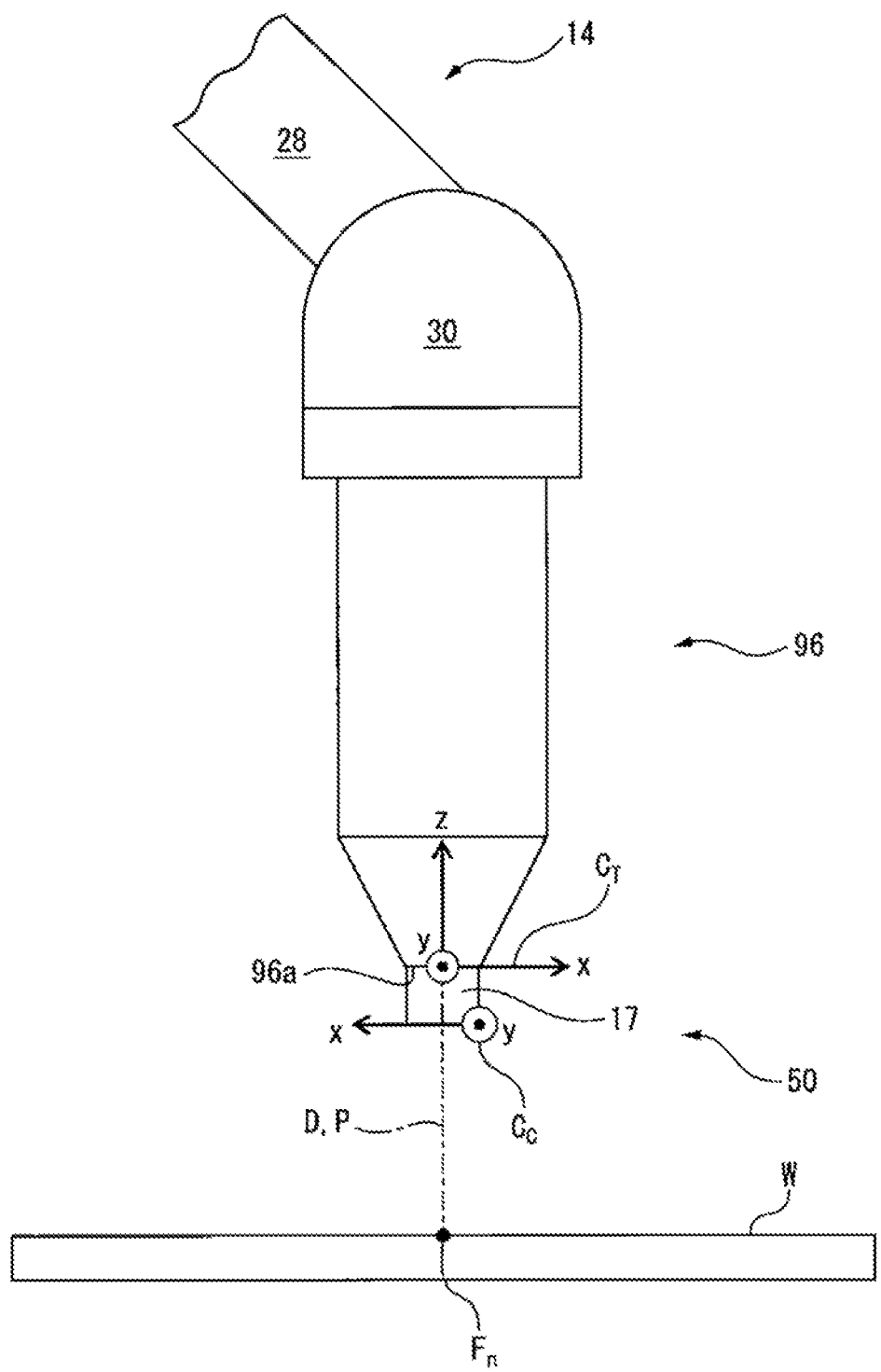
FIG. 15 is an enlarged view of a tool according to another embodiment.

As illustrated in FIG. 15, the camera 17 of the device 50 is positioned in a predetermined positional relationship with the tool 96. Specifically, the camera 17 is disposed at the emission port 96a of the tool 96 such that the visual line direction D thereof coincides with the optical axis P (i.e., the z-axis of the tool coordinate system $C_T$).

When acquiring the deviation amount, the processor 18 operates the movement machine 14 in accordance with the work program so as to move the tool 96 toward the n-th teaching point $C_n$. Then, the processor 18 transmits a command to the camera 17 to image the n-th target position $B_n$ at a time point $\tau_n$ when causing the tool 96 to perform the operation for the laser machining work on the n-th target position $B_n$.

As an example, the time point $\tau_n$ in the present embodiment may be set to a time point when the processor 18 transmits the laser oscillation command to the laser oscillator. As another example, the time point $\tau_n$ may be set to a time point when the laser beam is actually emitted from the tool 96. In this respect, a time $\tau_y$ from the time point when the processor 18 transmits the laser oscillation command to the laser oscillator to a time point when the tool 96 actually emits the laser beam can be predicted from e.g. the specification of the laser oscillator. Therefore, the time point $\tau_n$ when the laser beam is actually emitted from the tool 96 can be determined as a time point when the time $\tau_y$ elapses from the time point when the laser oscillation command is transmitted to the laser oscillator.

Thus, the camera 17 captures the image data 60 depicting the n-th target position $B_n$ at the time point $\tau_n$ as illustrated in FIG. 5. In the present embodiment, since the camera 17 is disposed in the positional relationship with the tool 96 in which the visual line direction D thereof coincides with the optical axis P, the center point (central pixel) $F_n$ in the imaged image data 60 can be regarded as the working position $F_n$ where the laser beam is irradiated on the workpiece W during the actual laser machining work. The processor 18 functions as the deviation amount acquisition section 52 to acquire the deviation amounts $x_T$ and $y_T$ (or deviation amount $E_T$) from the image data 60, and then, functions as the position correction section 54 to correct the n-th teaching point $C_n$ based on the deviation amounts $x_T$ and $y_T$ (or deviation amount $E_T$), similar as the embodiment shown in FIG. 3.

Note that, in the embodiment illustrated in FIG. 15, the camera 17 may be arranged in a positional relationship with the tool 96 in which the visual line direction D thereof is parallel to the optical axis P and offset from the optical axis P by a predetermined distance. In this case, the processor 18 can acquire the deviation amounts $x_T$ and $y_T$ (or deviation amount $E_T$) by the same method as the embodiment illustrated in FIG. 6.

Alternatively, in the embodiment illustrated in FIG. 15, the camera 17 may be arranged in a positional relationship with the tool 96 in which the visual line direction D thereof is inclined with respect to the optical axis P by a predetermined angle $\theta$. In this case, the processor 18 can acquire the deviation amounts $x_T$ and $y_T$ (or deviation amount $E_T$) by the same method as the embodiment illustrated in FIG. 8.

Figure 16:
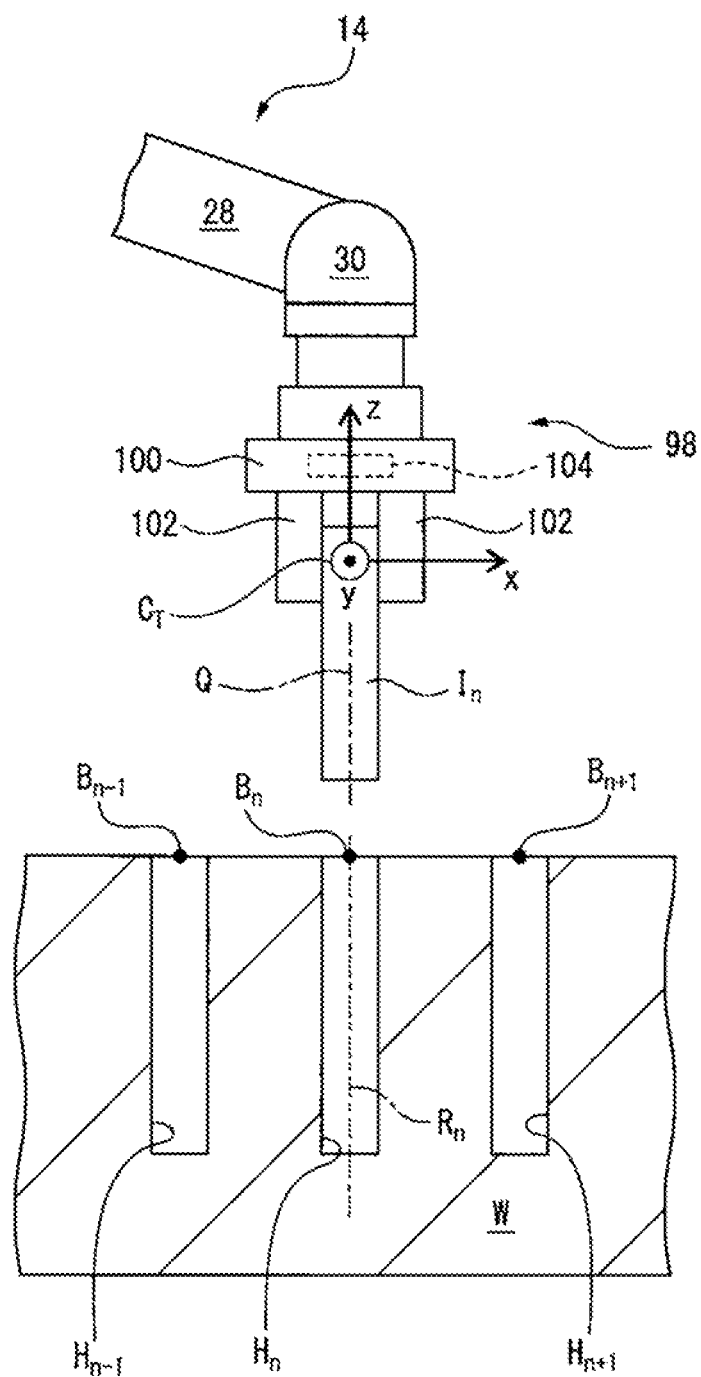
FIG. 16 is an enlarged view of a tool according to yet another embodiment.
Figure 17:
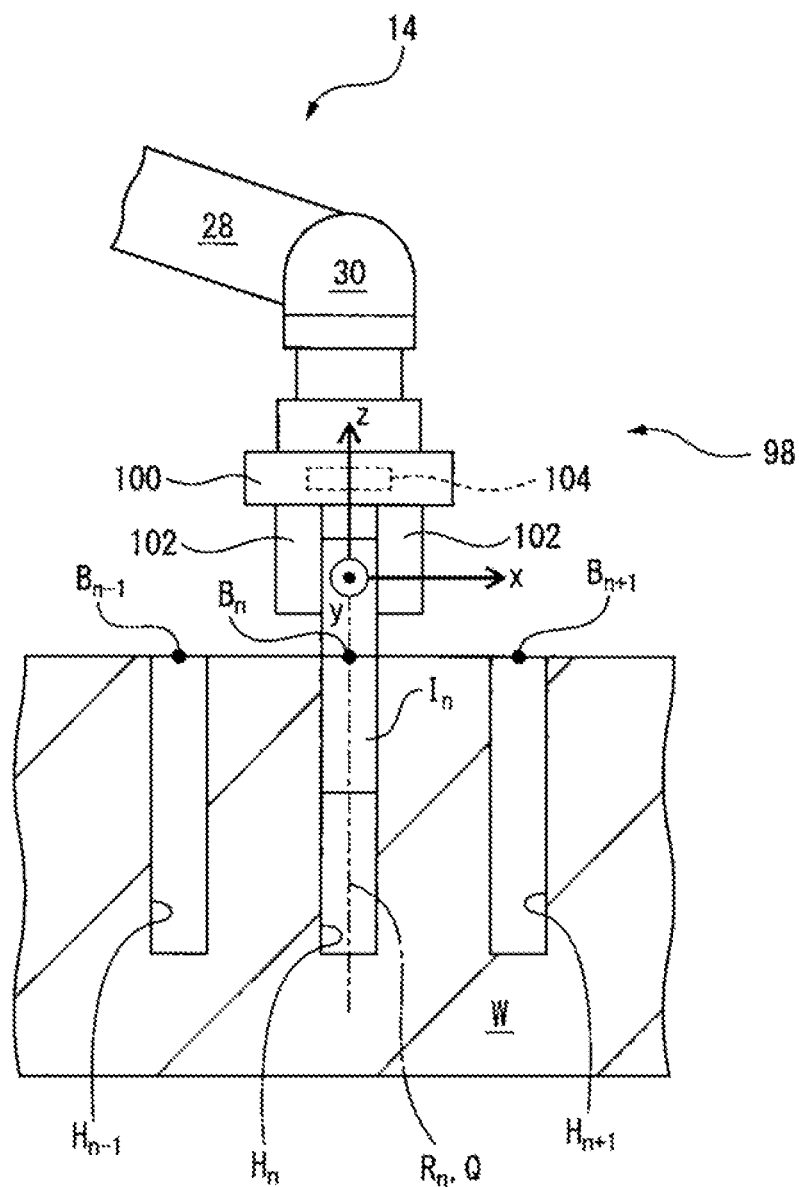
FIG. 17 illustrates a state in which the tool illustrated in FIG. 16 performs the work of fitting the components into the holes.
Figure 18:
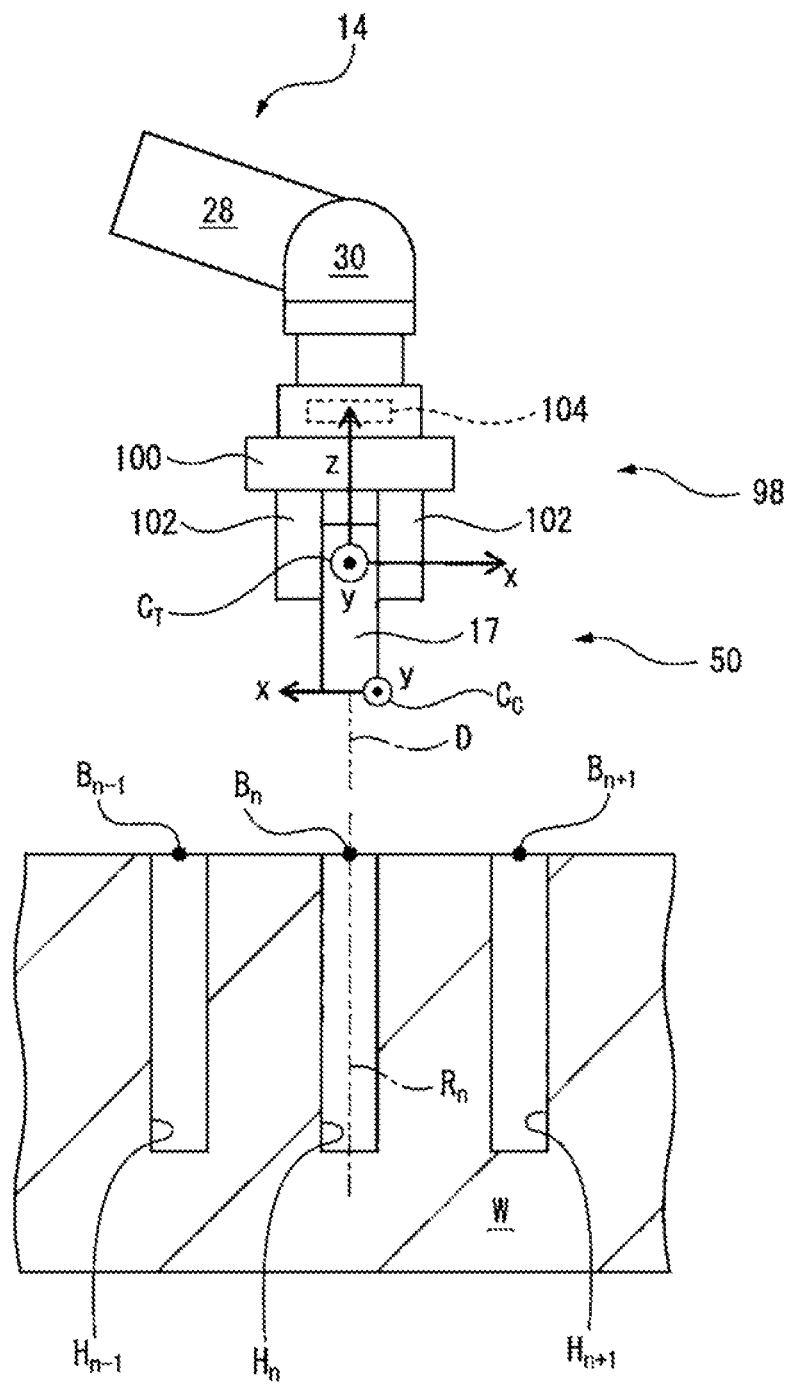
FIG. 18 illustrates a state where the camera is installed in the tool illustrated in FIG. 16.

Referring now to FIG. 16 to FIG. 18, a tool 98 according to yet another embodiment will be described. The tool 98 is a robot hand configured to grip an n-th component $I_n$ (n=1, 2, 3, . . . ) and fit it into an n-th hole $H_n$ formed in the workpiece W. The n-th component $I_n$ is a rod-like member (e.g., cylindrical) having a center axis Q. The n-th hole $H_n$ is formed at the n-th target position $B_n$ on the workpiece W, and has a center axis $R_n$. For example, the n-th target position $B_n$ may be defined as the opening center of the n-th hole $H_n$ on the surface of the workpiece W. In this case, the axis $R_n$ passes the n-th target position $B_n$.

The tool 98 is attach to the wrist 30 of the movement machine 14, instead of the tool 16 described above. Specifically, the tool 98 includes a hand base 100 coupled to the wrist 30, a plurality of fingers 102 provided at the hand base 100 so as to open and close, and a driver 104 configured to drive the plurality of fingers 102 to open and close. The driver 104 is e.g. an air cylinder or a motor, and can grip and release an object by opening and closing the finger 102.

The tool coordinate system $C_T$ is set for the tool 98. In the present embodiment, the tool coordinate system $C_T$ is set for the tool 98 such that the origin thereof is arranged at the gripping position of the fingers 102 (alternatively, a position between the fingers 102) and the z-axis thereof is orthogonal to the opening and closing direction of the fingers 102.

Next, the fitting work performed by the tool 98 will be described with reference to FIG. 16 and FIG. 17. The workpiece W may be fixed to a predetermined position by a jig, or may be moved by a belt conveyor, for example. The processor 18 operates the movement machine 14 so as to grip, by the tool 98, the n-th component $I_n$ stored in a predetermined storage location. At this time, the tool 98 grips the n-th component $I_n$ such that the z-axis of the tool coordinate system $C_T$ coincides with the axis Q.

The processor 18 then operates movement machine 14 so as to position the tool 98 at the n-th teaching point $C_n$ for performing the fitting work to fit the gripped n-th component $I_n$ into the n-th hole $H_n$. Specifically, the processor 18 sets the tool coordinate system $C_T$ such that the origin thereof is arranged at the n-th teaching point $C_n$ and the z-axis thereof (i.e., axis Q) substantially coincides with the axis $R_n$ of the n-th hole $H_n$.

Then, the processor 18 operates the movement machine 14 such that the position of the tool 98 coincides with that defined by the set tool coordinate system $C_T$. As a result, the tool 98 and the n-th component $I_n$ gripped by the tool 98 are arranged with respect to the workpiece W as illustrated in FIG. 16. Then, the processor 18 transmits a fitting start command to the movement machine 14. In response, the movement machine 14 moves the tool 98 in the z-axis negative direction of the tool coordinate system $C_T$ to fit the n-th component $I_n$ gripped by the tool 98 into the n-th hole $H_n$. As a result, the n-th component $I_n$ is fitted into the n-th hole $H_n$ by the tool 98, as illustrated in FIG. 17.

The processor 18 repeatedly performs such a fitting work to fit the plurality of components $I_n$ into the plurality of holes $B_n$, respectively. The processor 18 performs a series of operations for the fitting work in accordance with a work program. The work program includes e.g. position information of the n-th teaching point $C_n$, a positioning command for positioning the tool 98 to the n-th teaching point $C_n$, and the fitting start command, etc.

When the processor 18 performs the fitting work to fit the n-th component $I_n$ into the n-th hole $H_n$ in accordance with the work program, the working position where the n-th component $I_n$ engages with the workpiece W can deviate from the n-th hole $H_n$ (i.e., the n-th target position $B_n$). Therefore, in the present embodiment, the device 50 acquires the deviation amount of the working position of the tool 98 with respect to the n-th target position $B_n$, similar as the above-described embodiments.

As illustrated in FIG. 18, the camera 17 of the device 50 is gripped by the tool 98 (or fixed to the tool 98) so as to be positioned in a predetermined positional relationship with the tool 98. Specifically, the camera 17 is arranged such that the visual line direction D thereof coincides with the axis Q of the n-th component $I_n$ gripped by the tool 98 (or the z-axis of the tool coordinate system $C_T$).

When acquiring the deviation amount, the processor 18 operates the movement machine 14 in accordance with the work program so as to move the tool 98 toward the n-th teaching point $C_n$. Then, the processor 18 transmits a command to the camera 17 to image the n-th target position $B_n$ at a time point $\tau_n$ when causing the tool 98 to perform an operation for the fitting work on the n-th target position $B_n$ (n-th hole $H_n$).

As an example, the time point $\tau_n$ in the present embodiment may be set to a time point when the processor 18 transmits the fitting start command to the movement machine 14. As another example, the time point $\tau_n$ may be set to a time point when the n-th component $I_N$ gripped by the tool 98 engages with the workpiece W (alternatively, a distal end of the n-th component $I_n$ reaches the surface of the workpiece W).

In this respect, a time $\tau_z$ from the time point when the processor 18 transmits the fitting start command to the time point when the n-th component $I_n$ gripped by the tool 98 engages with the workpiece W can be predicted from the acceleration and deceleration characteristics of the servo motor 31 of the movement machine 14, for example. Therefore, the time point $\tau_n$ when the n-th component $I_n$ gripped by the tool 98 engages with the workpiece W can be determined as a time point when the time $\tau_z$ elapses from the time point when the fitting start command is transmitted.

Figure 19:
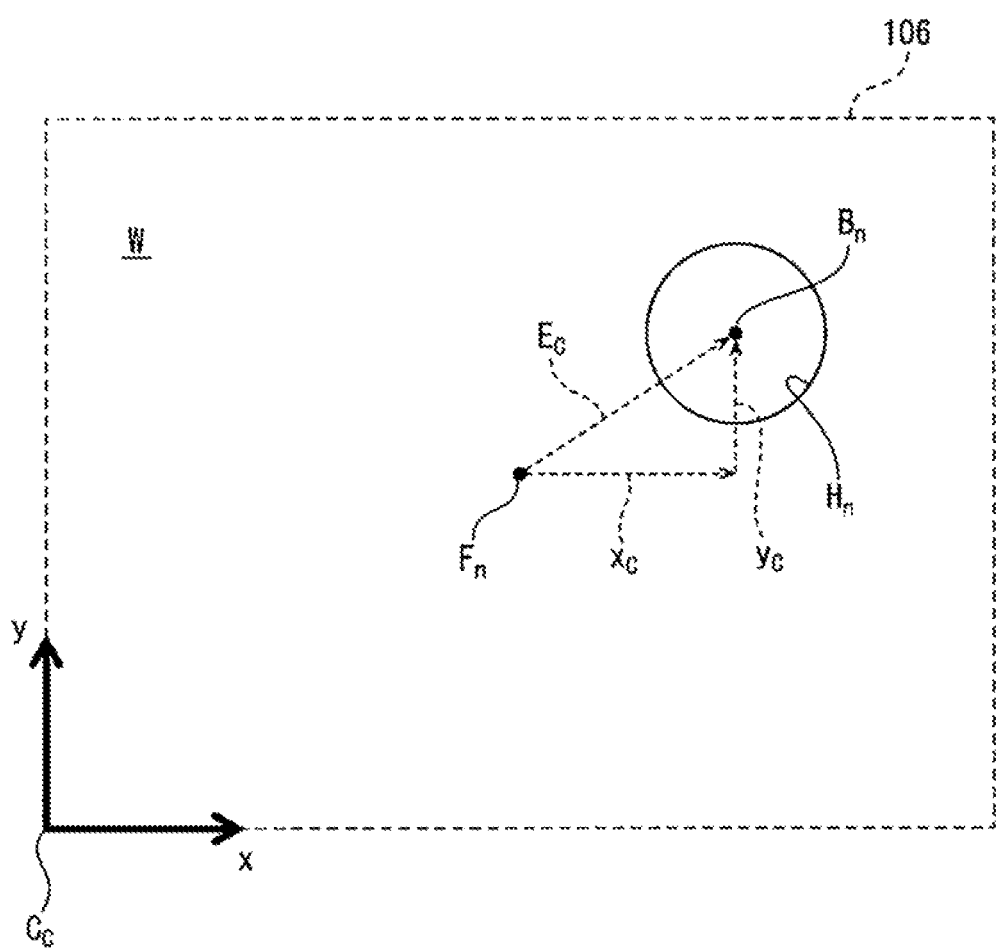
FIG. 19 illustrates an example of an image data imaged by the camera illustrated in FIG. 18.

Thus, the camera 17 images the n-th target position $B_n$ (n-th hole $H_n$) at the time point $\tau_n$. FIG. 19 illustrates an example of image data imaged by the camera 17 at this time. In an image data 106 illustrated in FIG. 19, the n-th hole $H_n$ formed in the workpiece W is depicted. As an example, the processor 18 analyzes the image data 106 to detect the center point of the n-th hole $H_n$, and acquires the coordinates of the detected center point in the camera coordinate system $C_c$ as the coordinates of the n-th target position $B_n$ in the camera coordinate system $C_c$.

Further, in the present embodiment, since the camera 17 is arranged in a positional relationship with the tool 98 in which the visual line direction D thereof coincides with the axis Q (z-axis of the tool coordinate system), the center point (central pixel) $F_n$ of the imaged image data 106 can be regarded as the working position $F_n$ where the n-th component $I_n$ engages with the workpiece W during the actual fitting work.

The processor 18 functions as the deviation amount acquisition section 52 to acquire the differences $x_c$ and $y_c$ (or difference E), using the coordinates of the n-th target position $B_n$ and the working position $F_n$ in the camera coordinate system $C_c$, and acquire the deviation amounts $x_T$ and $y_T$ (or deviation amount $E_T$) from the image data 106, similar as in the embodiment illustrated in FIG. 3. Then, the processor 18 functions as the position correction section 54 to correct the n-th teaching point $C_n$ based on the deviation amounts $x_T$ and $y_T$ (or deviation amount $E_T$), in the same manner as in the embodiment of FIG. 3.

Note that, in the embodiment illustrated in FIG. 18, the camera 17 may be arranged in a positional relationship with the tool 98 in which the visual line direction D thereof is parallel to the axis Q (z-axis of the tool coordinate system $C_c$) and offset from the axis Q by a predetermined distance. In this case, the processor 18 can acquire the deviation amounts $x_T$ and $y_T$ (or deviation amount $E_T$) by the same method as in the embodiment illustrated in FIG. 6.

Alternatively, in the embodiment illustrated in FIG. 18, the camera 17 may be arranged in a positional relationship with the tool 98 in which the visual line direction D thereof is inclined at a predetermined angle θ with respect to the axis Q. In this case, the processor 18 can acquire the deviation amounts $x_T$ and $y_T$ (or deviation amount $E_T$) by the same method as in the embodiment illustrated in FIG. 8.

In the above embodiments, the control device 12 controls the movement machine 14 and the tool 16, 96 or 98. However, the control device 12 controls the movement machine 14, while the tool 16, 96 or 98 may be controlled by a control device other than the control device 12. Such an embodiment is illustrated in FIG. 20.

Figure 20:
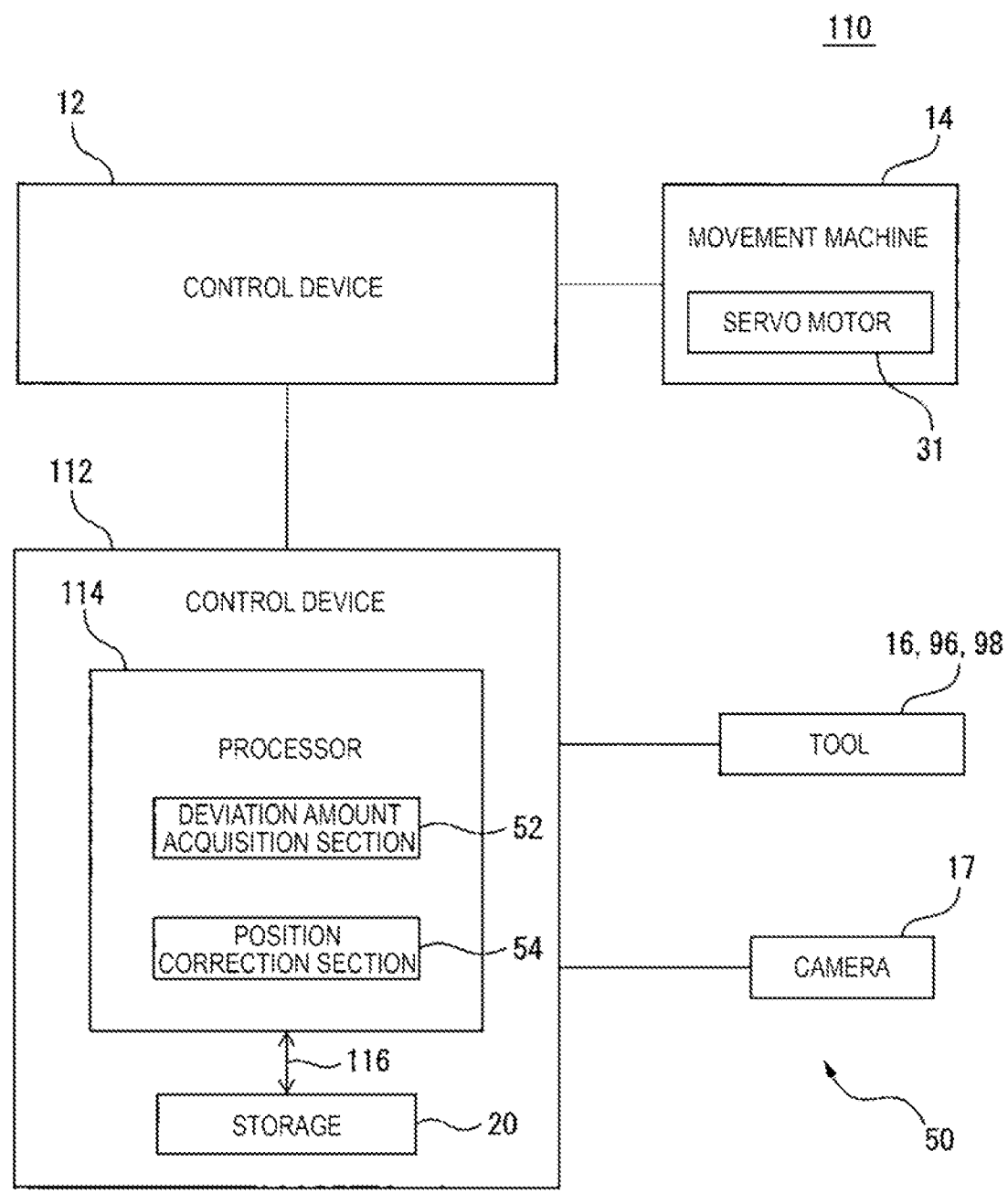
FIG. 20 is a block diagram of a machine system according to yet another embodiment.

A machine system 110 illustrated in FIG. 20 includes the control device 12, the movement machine 14, the tools 16, 96 or 98, the camera 17, and a second control device 112. The second control device 112 is communicatively connected to the control device 12. The second control device 112 includes a processor 114 and the storage 20 communicatively connected to the processor 114 via a bus 116. The processor 114 controls the tools 16, 96, or 98. The processor 114 functions as the deviation amount acquisition section 52 and the position correction section 54 of the device 50. Further, the processor 114 transmits a command to the camera 17 to control the imaging operation by the camera 17.

Figure 21:
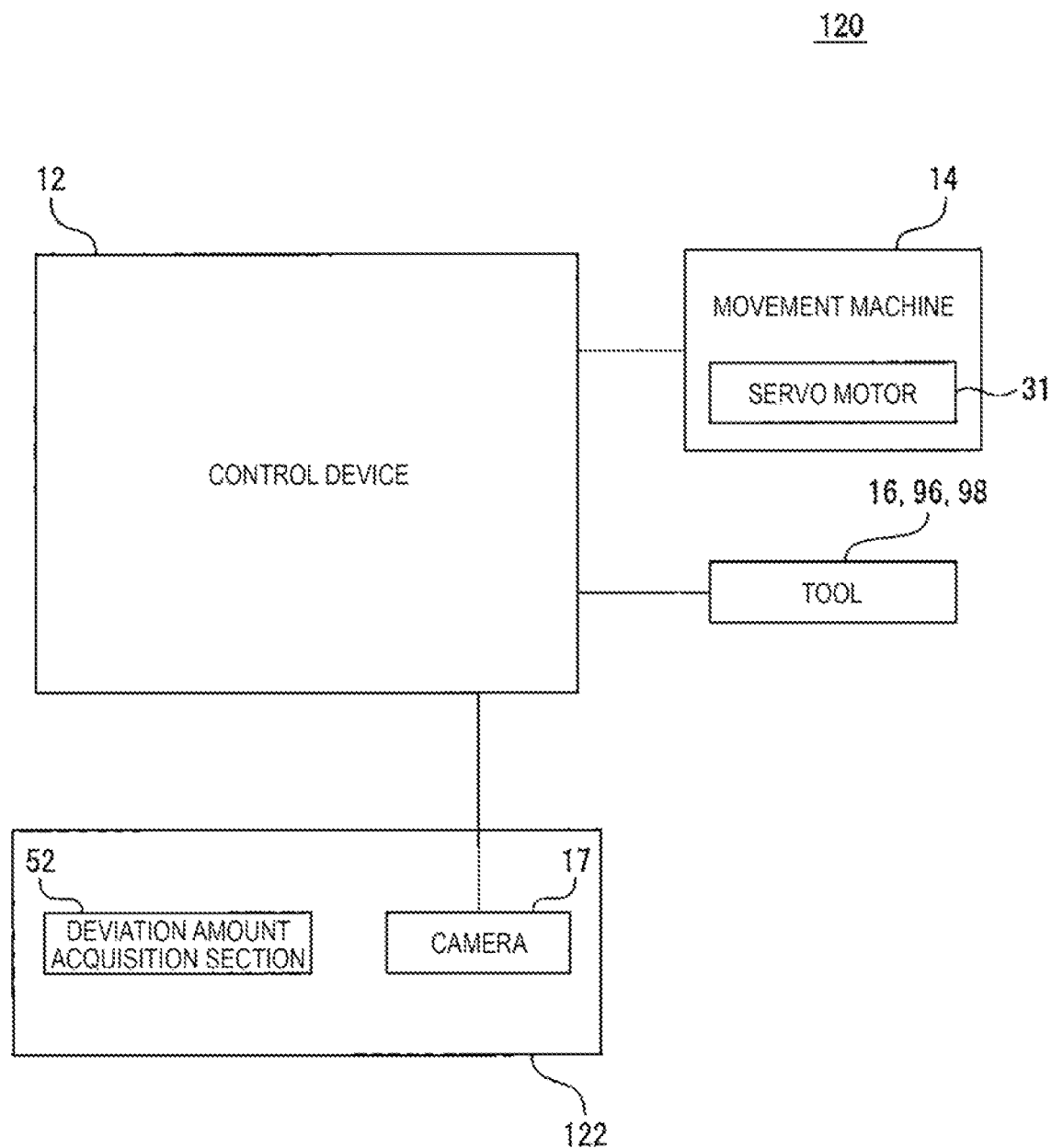
FIG. 21 is a block diagram of a machine system according to yet another embodiment.

Note that, the deviation amount acquisition section 52 may be provided separately from the control device 12 or 112. Such an embodiment is illustrated in FIG. 21. A machine system 120 illustrated in FIG. 21 includes the control device 12, the movement machine 14, the tool 16, 96 or 98, and the device 122. The device 122 is configured to acquire the deviation amount of the working position of the tool 16, 96 or 98 with respect to the n-th target position $B_n$, similarly to above-described the device 50, and includes the deviation amount acquisition section 52 and the camera 17. The camera 17 is connected to the control device 12 and images the n-th target position $B_n$ at the time point $\tau_n$. The deviation amount acquisition section 52 may include one computer having a processor and a storage.

In the above embodiments, the processor 18 converts the differences $x_c$ and $y_c$ or the difference $E_c$ in the camera coordinate system $C_c$ into the deviation amounts $x_T$ and $y_T$ or the deviation amount $E_T$ in the tool coordinate system $C_T$. However, the processor 18 may convert the differences $x_c$ and $y_c$ or the difference $E_c$ in the camera coordinate system $C_c$ into the movement machine coordinate system $C_M$ (or the world coordinate system).

For example, after calculating the deviation amount in the tool coordinate system $C_T$, the processor 18 may convert the deviation amount in the tool coordinate system $C_T$ into the movement machine coordinate system $C_M$ (or the world coordinate system). Alternatively, the operator may calibrate the camera coordinate system $C_c$ and the movement machine coordinate system $C_M$ (or the world coordinate system) in advance, and the processor 18 may convert the differences $x_c$, $y_c$, $E_c$ in the camera coordinate system $C_c$ to the movement machine coordinate system $C_M$ (or the world coordinate system), thereby acquiring a deviation amount in the movement machine coordinate system $C_M$ (or the world coordinate system).

The position of the tool coordinate system $C_T$ with respect to the tool 16, 96 or 98 is not limited to the above-described embodiments, but may be arranged at any desired position. Further, in the embodiment illustrated in FIG. 3, 6 or 8, the processor 18 may move the movable arm 36 when imaging the n-th target position $B_n$ by the camera 17. Although the present disclosure has been described through the above embodiments, the above embodiments are not intended to limit the claimed invention.

The invention claimed is:

1. A method of acquiring a deviation amount of a working position of a tool with respect to a target position on a workpiece when performing a work on the target position by the tool moved by a movement machine, the method comprising:

controlling, via a processor, the movement machine and the tool in accordance with a work program;

imaging the target position by a camera arranged in a predetermined positional relationship with the tool at a first time point when the processor causes the tool to perform an operation for the work, the first time point being a time point when the processor transmits a command for causing the tool to perform the operation in accordance with the work program, or a time point when a predetermined time elapses from the time point when the processor transmits the command; and acquiring a deviation amount between the working position and the target position at the first time point, based on a position of the target position in image data imaged by the camera and on information indicating a position of the working position in the image data.

2. A device configured to acquire a deviation amount of a working position of a tool with respect to a target position on a workpiece when performing a work on the target position by the tool moved by a movement machine, the device comprising:

a processor configured to control the movement machine and the tool in accordance with a work program; and a camera arranged in a predetermined positional relationship with the tool, and configured to image the target position at a first time point when the processor causes the tool to perform an operation for the work, the first time point being a time point when the processor transmits a command for causing the tool to perform the operation in accordance with the work program, or a time point when a predetermined time elapses from the time point when the processor transmits the command, wherein the processor is further configured to acquire a deviation amount between the working position and the target position at the first time point, based on a position of the target position in image data imaged by the camera and on information indicating a position of the working position in the image data.

3. The device of claim 2, further comprising a storage configured to pre-store the information.

4. The device of claim 2, further comprising a light irradiation device provided at the tool and configured to irradiate the workpiece with light for indicating the working position when the camera images the image data, wherein the processor acquires the deviation amount using a position of the light in the image data as the information.

5. A device configured to acquire a deviation amount of a working position of a tool with respect to a target position on a workpiece when performing a work on the target position by the tool moved by a movement machine, the device comprising:

a camera arranged in a predetermined positional relationship with the tool, and configured to image the target position at a first time point when causing the tool to perform an operation for the work; and a processor configured to acquire a deviation amount between the working position and the target position at the first time point, based on a position of the target position in image data imaged by the camera and on information indicating a position of the working position in the image data, wherein the tool contacts the workpiece at the working position when performing the work, wherein the first time point is a time point when causing the tool to contact the workpiece.

6. The device of claim 2, wherein the tool is a welding gun including a fixed electrode and a movable electrode configured to move along an axis toward and away from the fixed electrode, wherein the camera is arranged such that a visual line direction of the camera is parallel to the axis.

7. The device of claim 6, wherein the camera is arranged at a position on the movable electrode such that the visual line direction coincides with the axis.

8. The device of claim 2, wherein the tool is a laser machining head configured to emit a laser beam along an optical axis, wherein the camera is arranged such that a visual line direction of the camera coincides with the optical axis.

9. The device of claim 2, wherein the tool is a robot hand configured to grip a component and fit the component into a hole provided at the target position, wherein the camera is arranged such that a visual line direction of the camera is parallel to an axis of the component gripped by the tool.

10. The device of claim 2, wherein the processor is further configured to correct a position of the movement machine such that the working position is to be arranged at the target position at the first time point when the processor executes the work program, based on the deviation amount acquired by the processor.

11. The device of claim 2, wherein the camera further images the target position at a second time before or after the first time point, wherein the processor further acquires a second deviation amount between the working position and the target position at the second time point, based on a position of the target position in second image data imaged by the camera at the second time point and on information indicating a position of the working position in the second image data.

12. The device of claim 2, wherein the processor is configured to:

obtain a difference between the target position and the working position in a camera coordinate system using coordinates of the target position and the working position in the camera coordinate system, the camera coordinate system defining coordinates of the image data; and acquire the deviation amount in a control coordinate system set for the tool or the movement machine, using the difference and a known positional relationship between the control coordinate system and the camera coordinate system.

* * * * *